United States Patent
Fu

(10) Patent No.: US 7,402,255 B2
(45) Date of Patent: Jul. 22, 2008

(54) MEMS SCANNING MIRROR WITH TRENCHED SURFACE AND I-BEAM LIKE CROSS-SECTION FOR REDUCING INERTIA AND DEFORMATION

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 292 days.

(21) Appl. No.: 11/370,417

(22) Filed: Mar. 7, 2006

(65) Prior Publication Data

US 2006/0166444 A1 Jul. 27, 2006

Related U.S. Application Data

(62) Division of application No. 10/778,742, filed on Feb. 13, 2004, now Pat. No. 7,046,421.

(51) Int. Cl.
*B29D 11/00* (2006.01)

(52) U.S. Cl. .............................. 216/24; 216/72; 216/74; 216/80; 359/291; 359/224; 359/223; 359/290; 359/292; 359/298

(58) Field of Classification Search .................. 216/24; 359/291
See application file for complete search history.

(56) References Cited

U.S. PATENT DOCUMENTS

| | | | |
|---|---|---|---|
| 6,353,492 B2 * | 3/2002 | McClelland et al. | ........ 359/254 |
| 6,914,711 B2 | 7/2005 | Novotny et al. | |
| 2005/0002085 A1 | 1/2005 | Matsui | |

FOREIGN PATENT DOCUMENTS

| | | |
|---|---|---|
| JP | 2682181 | 10/1991 |
| JP | 2003-172897 | 6/2003 |
| JP | 2004-37886 | 2/2004 |

* cited by examiner

*Primary Examiner*—Duy-Vu N. Deo
*Assistant Examiner*—Maki Angadi
(74) *Attorney, Agent, or Firm*—Patent Law Group LLP; David C. Hsia

(57) ABSTRACT

A micro-electro-mechanical system (MEMS) device includes a mirror having a top surface with trenches, a beam connected to the mirror, rotational comb teeth connected to the beam, and one or more springs connecting the beam to a bonding pad. The mirror can have a bottom surface for reflecting light. The mirror can include a top flange and a bottom flange joined by a web, wherein the top and the bottom flanges form the top and the bottom surfaces, respectively. The rotational comb teeth can have a tapered shape. Stationary comb teeth can be interdigitated with the rotational comb teeth either in-plane or out-of-plane. Steady or oscillating voltage difference between the rotational and the stationary comb teeth can be used to oscillate or tune the mirror.

10 Claims, 29 Drawing Sheets

MEMS SCANNING MIRROR WITH TRENCHED SURFACE AND I-BEAM LIKE CROSS-SECTION FOR REDUCING INERTIA AND DEFORMATION

CROSS REFERENCE TO RELATED APPLICATIONS

This application is a divisional of application Ser. No. 10/778,742, filed Feb. 13, 2004 now U.S. Pat. No. 7,046,421, which is incorporated herein by reference.

FIELD OF INVENTION

This invention relates to micro-electro-mechanical system (MEMS) devices, and more particularly to MEMS scanning mirrors.

DESCRIPTION OF RELATED ART

Various electrostatic comb actuator designs for MEMS scanning mirrors have been proposed. The extensive applications of these devices include barcode readers, laser printers, confocal microscopes, projection displays, rear projection TVs, and wearable displays. Typically a MEMS scanning mirror is driven at its main resonance to achieve a large scan angle. To ensure a stable operation, it is crucial to ensure the mirror and its associated movable structure will vibrate in the desired mode shape at the lowest and main resonant frequency. In many applications, the mirror size has to be large and the mirror surface has to be flat to ensure high optical resolution. The mirror vibration/scanning speed also has to be fast for many applications. It is known that when the mirror size and scanning speed increase, the mirror dynamic flatness deteriorates. Without a flat mirror surface, the scanning mirror is of little use to many applications. In addition, this main frequency has to be separated far from other structural vibration frequencies to avoid potential coupling between the desired and the undesired mode shapes.

The undesired structural vibrations will increase the mirror dynamic deformation and result in degraded optical resolution. Furthermore, some of the structural vibration modes may cause the rotationally movable and stationary comb teeth to come into contact and break the actuator all together. Two or more structural vibration modes with close resonant frequencies may be coupled to produce high vibration amplitude that leads to hinge failure. Thus, an apparatus and a method are needed in the design of MEMS scanning mirrors to effectively improve the vibration stability at resonance, and to ensure optical resolution of these devices.

SUMMARY

In one embodiment of the invention, a MEMS device includes a mirror having a top surface with trenches, a beam connected to the mirror, rotational comb teeth connected to the beam, and one or more springs connecting the beam to a bonding pad. The mirror can have a bottom surface for reflecting light. The mirror can include a top flange and a bottom flange joined by a web, wherein the top and the bottom flanges form the top and the bottom surfaces, respectively. The rotational comb teeth can have a tapered shape. The beam can be connected to the mirror at multiple locations. Stationary comb teeth can be interdigitated with the rotational comb teeth either in-plane or out-of-plane. A steady or oscillating voltage difference between the rotational and the stationary comb teeth can be used to oscillate or tune the mirror.

BRIEF DESCRIPTION OF THE DRAWINGS

Use of the same reference numbers in different figures indicates similar or identical elements.

DETAILED DESCRIPTION OF THE INVENTION

Figure 1A:
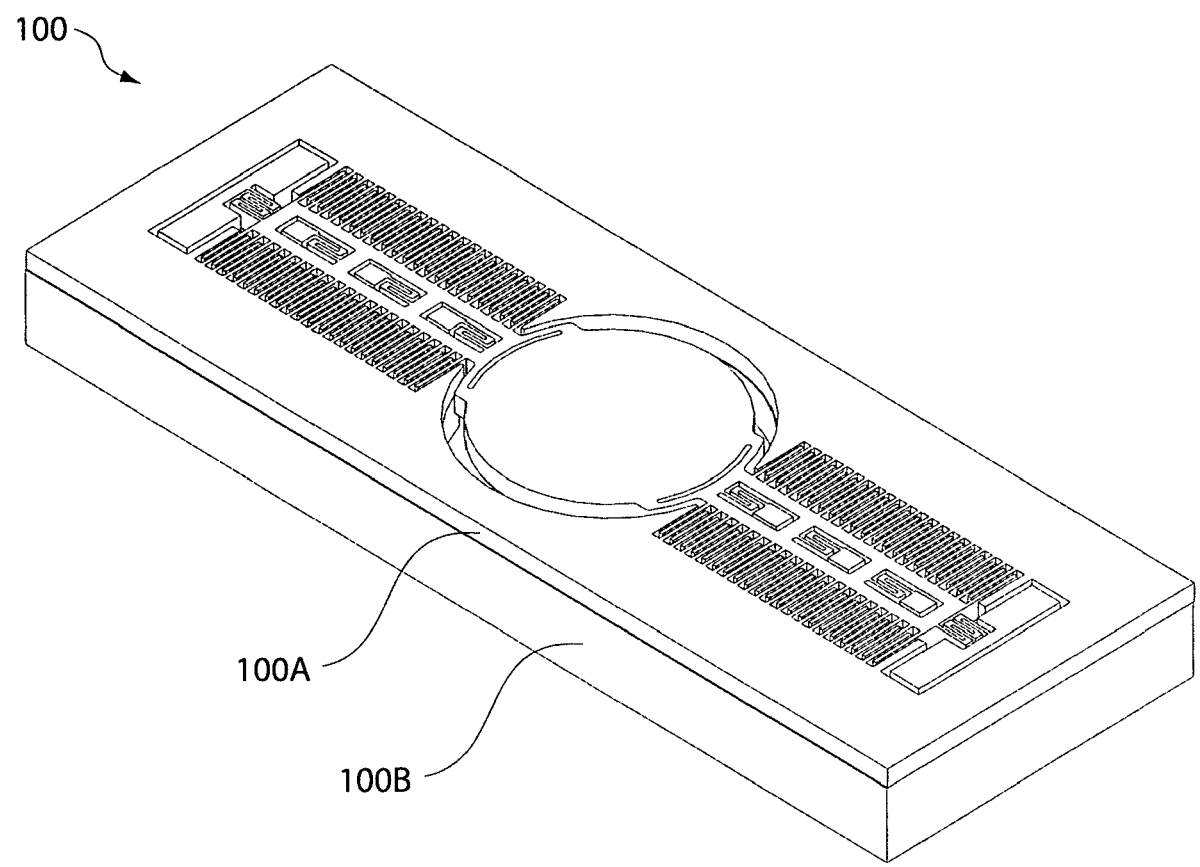
FIGS. 1A, 1B, and 1C illustrate top views of the layers in a MEMS device in one embodiment of the invention.

FIG. 1A illustrates a MEMS scanning mirror device 100 in one embodiment of the invention. Device 100 includes a top layer 100A (FIG. 1B) and a bottom layer 100B (FIG. 1C).

Figure 1B:
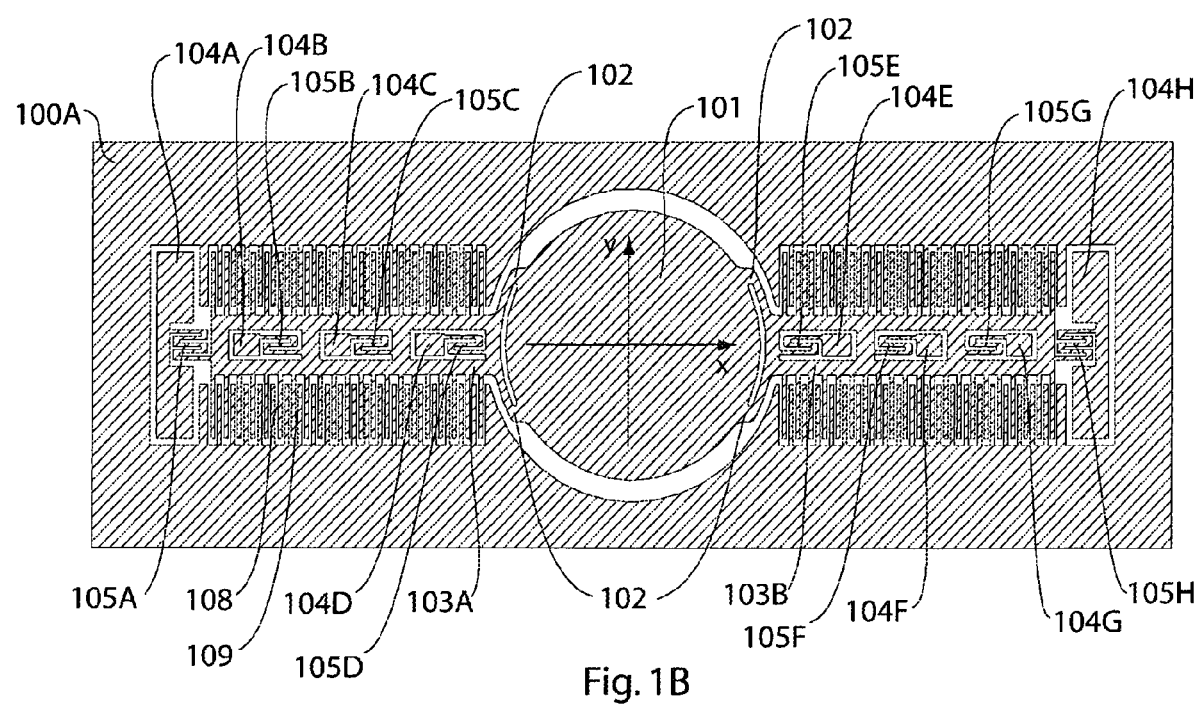
Figure 1C:
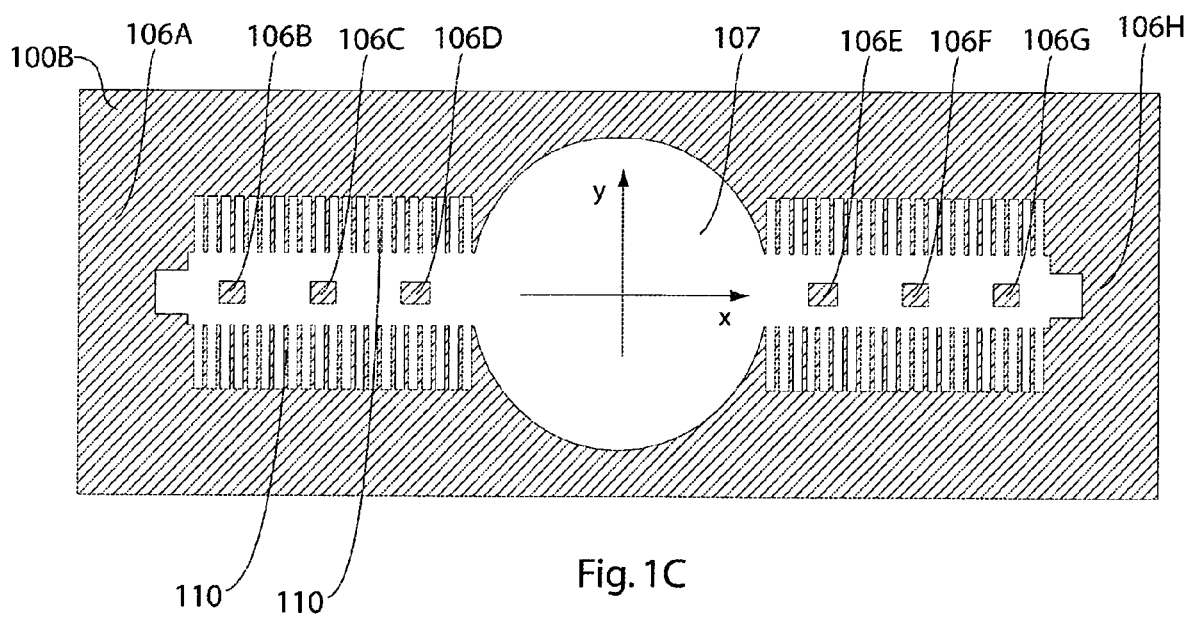

Referring to FIG. 1B, top layer 100A includes rotational comb teeth 108 that are connected on opposing sides of beam-like structures 103A and 103B. Proximate ends of beams 103A and 103B are connected by multiple support attachments 102 to opposing sides of a scanning mirror 101. In other words, each beam is connected at multiple locations to scanning mirror 101. The positions and the number of support attachments 102 can be refined through finite element analysis to improve the vibration stability and to minimize dynamic deformation of scanning mirror 101. By improving the vibration stability and reducing dynamic deformation of scanning mirror 101 with support attachments 102, the optical resolution of device 100 is improved.

Beams 103A and 103B are attached by eight serpentine springs/hinges 105A to 105H to bottom layer 100B (FIG. 1C) in a distributed manner along the rotational axis (e.g., the x-axis) of scanning mirror 101. Specifically, the distal end of beam 103A is connected by spring/hinge 105A to anchor 104A, and the distal end of beam 103B is connected by spring/hinge 105H to anchor 104H. Along their lengths, beam 103A is connected by springs/hinges 105B to 105D to corresponding anchors 104B to 104D, and beam 103B is connected by springs/hinges 105E to 105G to corresponding anchors 104E to 104G. In one embodiment, springs 105B to 105G are located within beams 103A and 103B. Anchors 104A to 104H are mounted to bottom layer 100B (FIG. 1C).

Top layer 100A may include stationary comb teeth 109. In one embodiment, stationary comb teeth 109 provide the electrostatic biasing force used to increase the driving efficiency of the movable structure by tuning its modal frequency. In another embodiment, stationary comb teeth 109 provide the electrostatic driving force to drive scanning mirror 101. In yet another embodiment, stationary comb teeth 109 provide both the electrostatic biasing force and the electrostatic driving force.

Referring to FIG. 1C, bottom layer 100B includes surfaces 106A to 106H that serve as anchoring surfaces for the movable structure in top layer 100A (FIG. 1A). Specifically, anchors 104A to 104H are bonded to corresponding surfaces 106A to 106H. Cavity 107 accommodates the rotation of scanning mirror 101 without touching bottom layer 100B. In one embodiment, stationary comb teeth 110 provide the electrostatic driving force to drive scanning mirror 101. In another embodiment, stationary comb teeth 110 provide the electrostatic biasing force used to increase the driving efficiency of the movable structure. In yet another embodiment, stationary comb teeth 110 provide both the electrostatic driving force and the electrostatic biasing force. Stationary comb teeth 108 and 110 are interdigitated with rotational comb teeth 108 when viewed from above.

As described above, springs 105A to 105H are distributed along beams 103A and 103B. By carefully adjusting the distribution of the torsional and translational stiffness of these springs, all modal frequencies of the movable structure can be effectively separated and the desired rotational mode can be designed at the lowest resonance frequency. Since the main resonant frequency is the lowest and far apart from other structural modal frequencies, the mirror rotation driven by a sinusoidal AC voltage will not excite any other undesired vibration mode.

Using multiple springs, the maximum stress and strain on each individual spring are noticeably lower than conventional scanning mirror designs supported by only a pair of torsional beams. Therefore, the distributed spring design significantly improves the device reliability and increases the rotational angle. In summary, the system reliability and the servo and the optical performance are all improved with embodiments of the invention.

Figure 2A:
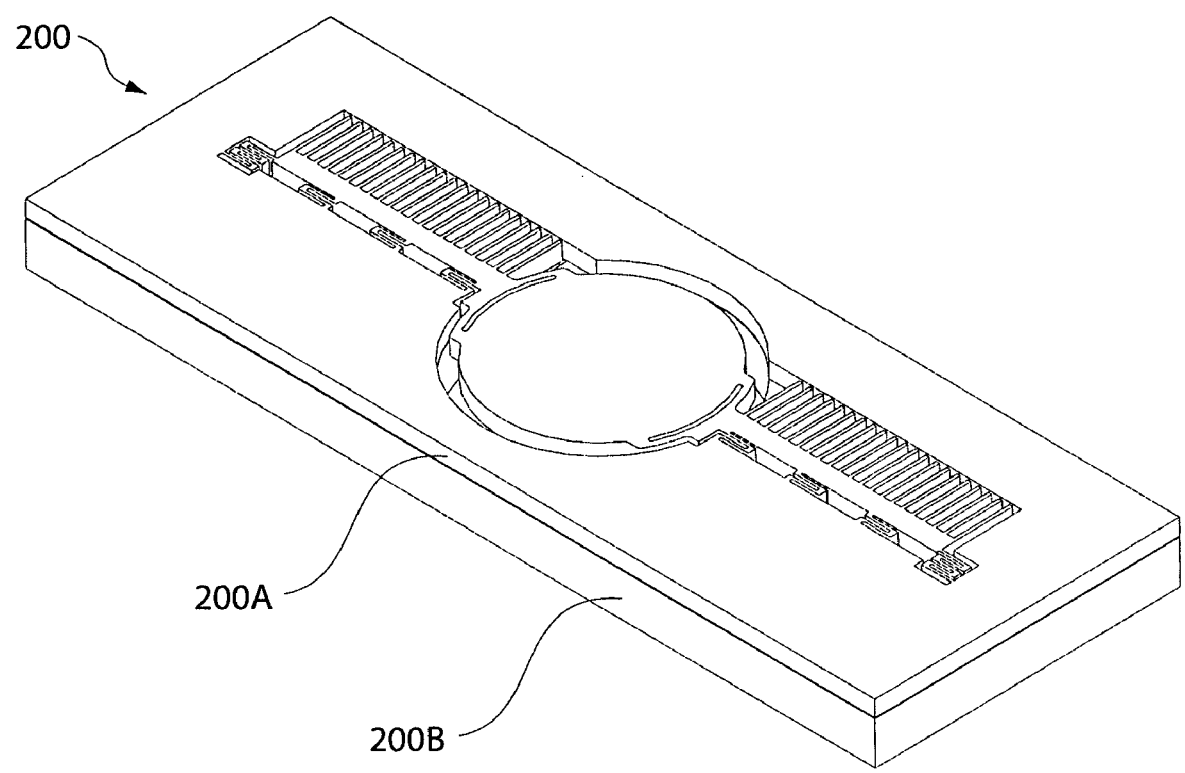
FIGS. 2A, 2B, and 2C illustrate top views of the layers in a MEMS device in another embodiment of the invention.

FIG. 2A illustrates a MEMS scanning mirror device 200 in one embodiment of the invention. Device 200 includes a top layer 200A (FIG. 2B) and a bottom layer 200B (FIG. 2C).

Figure 2B:
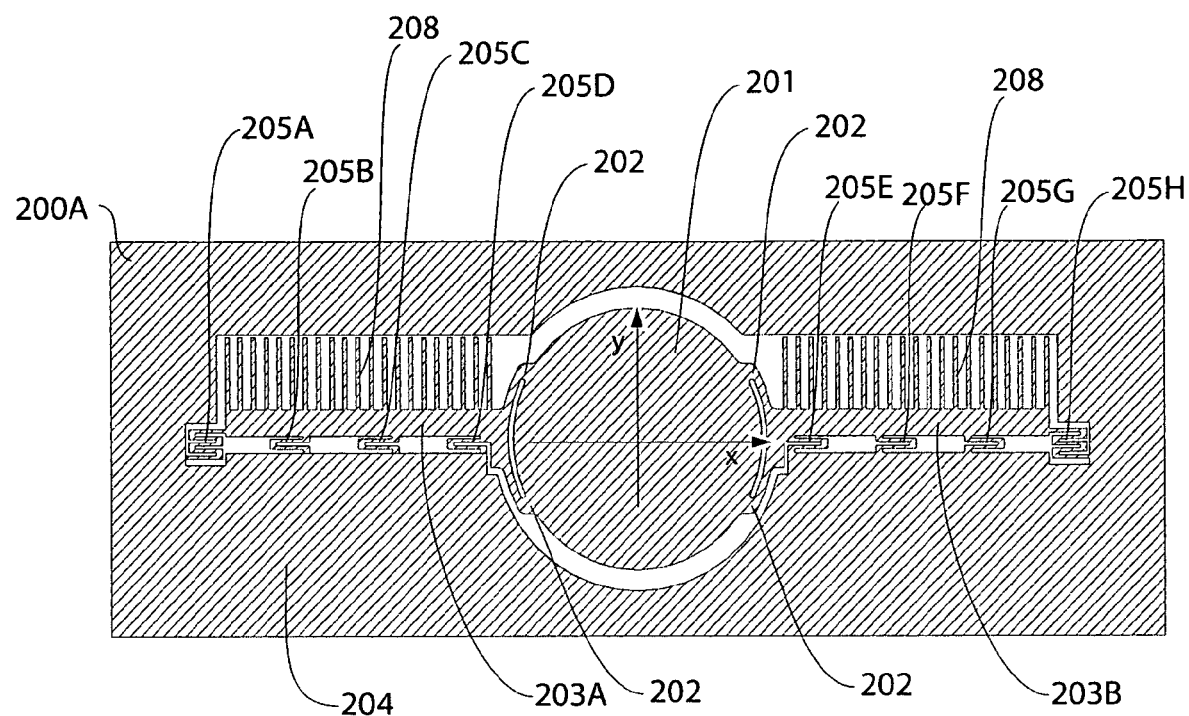

Referring to FIG. 2B, top layer 200A includes a mirror 201 connected by multiple support attachments 202 to beams 203A and 203B. Mirror 201 and support attachments 202 are similar to those shown in FIG. 1B. Rotational comb teeth 208 are connected to one side of beams 203A and 203B.

Beams 203A and 203B are connected by springs/hinges 205A to 205H to stationary surface 204 of top surface 200A in a distributed manner along the rotational axis of scanning mirror 201. Specifically, the distal end of beam 203A is connected by spring/hinge 205A to surface 204, and the distal end of beam 203B is connected by spring/hinge 205H to surface 204. Along their lengths, beam 203A is connected by springs/hinges 205B to 205D to surface 204, and beam 203B is connected by springs/hinges 205E to 205G to surface 204.

Figure 2C:
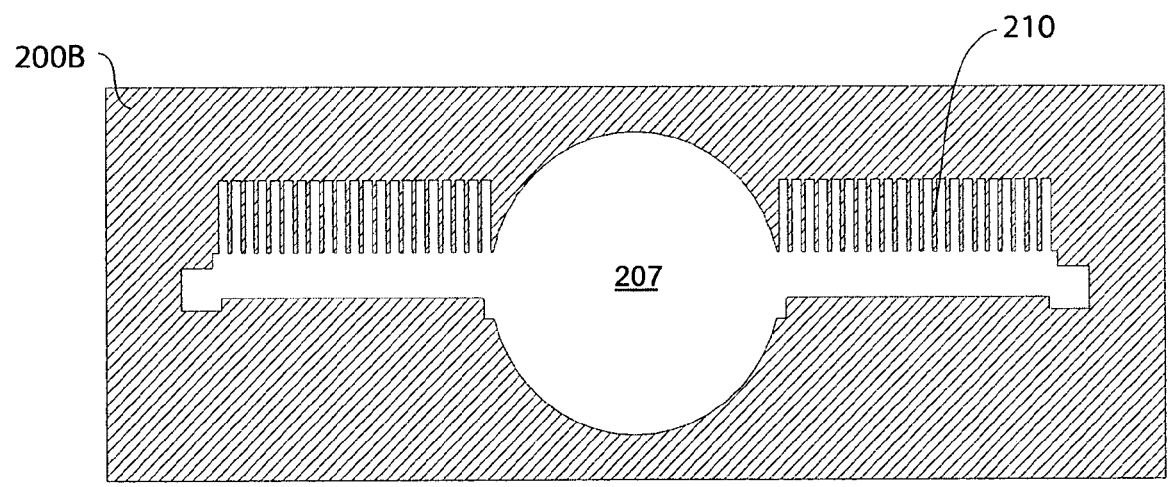

Referring to FIG. 2C, bottom layer 200B includes a cavity 207 that accommodates the rotation of scanning mirror 201 without touching bottom layer 200B. In one embodiment, stationary comb teeth 210 provide the electrostatic driving force to drive scanning mirror 201. In another embodiment, stationary comb teeth 210 provide the electrostatic biasing force used to increase the driving efficiency of the moving structure. In yet another embodiment, stationary comb teeth 210 provide both the electrostatic driving force and the electrostatic biasing force. Stationary comb teeth 210 are interdigitated with rotational comb teeth 208 when viewed from above.

Figure 3:
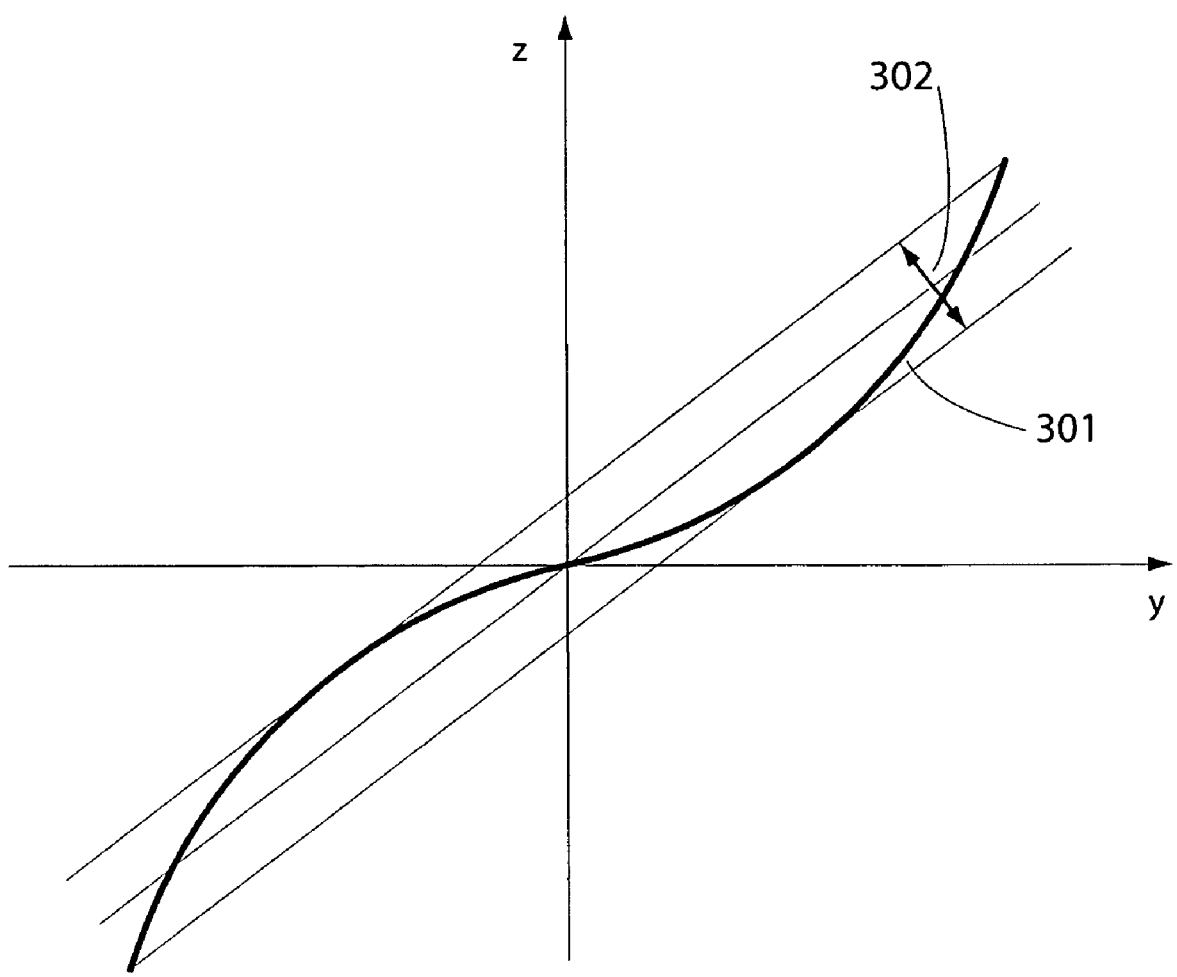
FIG. 3 illustrates a deformation of a scanning mirror in one embodiment of the invention.

FIG. 3 shows a typical mirror dynamic deformation of a mirror 301. Mirror 301 rotates along the x-axis, which points in or out of the page. The total mirror dynamic deformation 302 is shown. The x-axis and the y-axis form a plane where the original mirror surface resides. The z-axis is used to describe the mirror out-of-plane motion. The mirror dynamic deformation is a function of mirror thickness, scanning frequency, mirror size, and rotation angle. The peak-to-peak dynamic deformation has to be smaller than one fourth of the wavelength to prevent diffraction from limiting the optical performance of the scanning mirror. It is estimated that the proposed mirror attachment structures and methods shown in FIGS. 1A and 2A reduce the mirror dynamic deformation up to 50 percent.

Figure 4A:
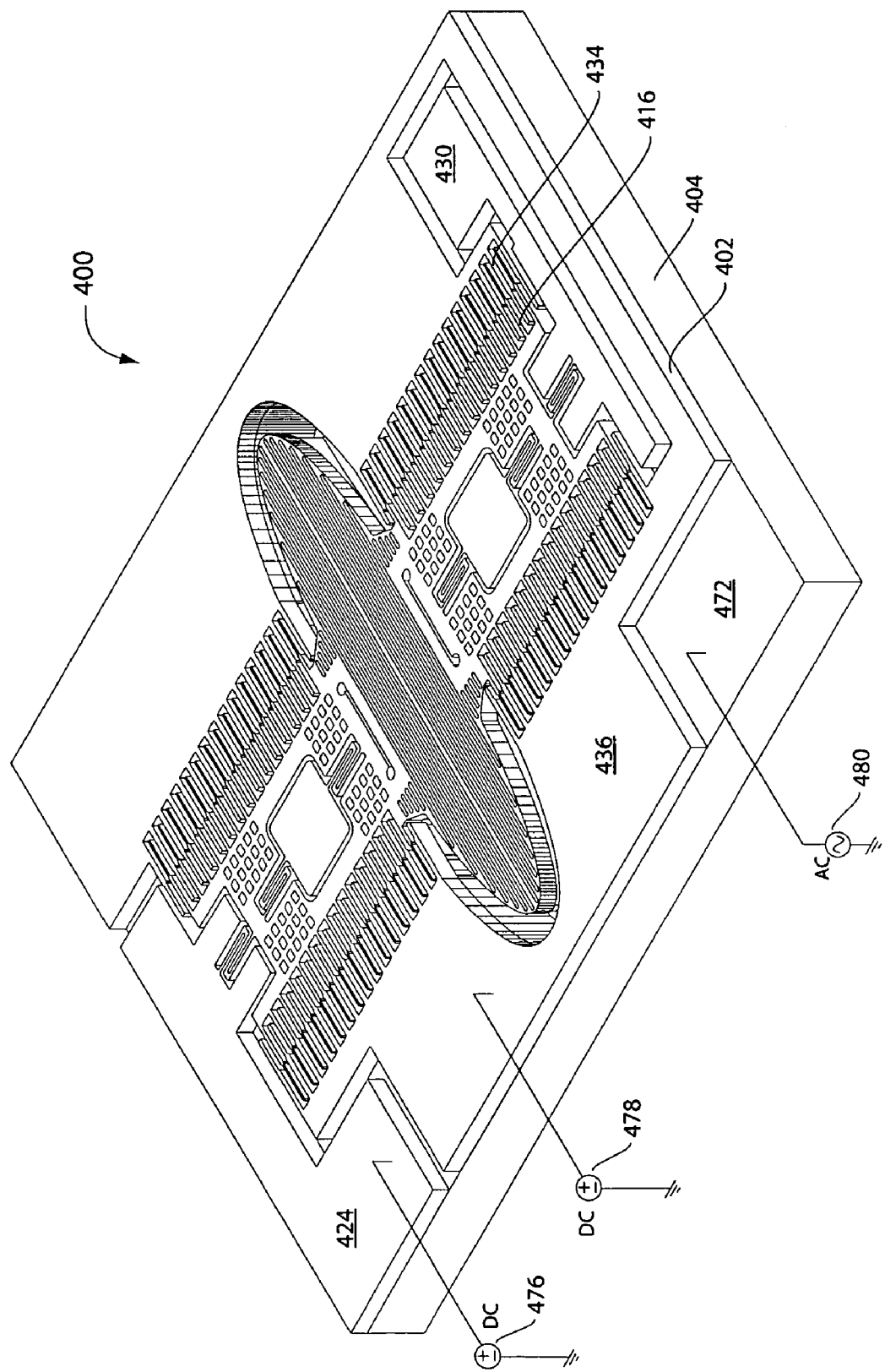
FIGS. 4A, 4B, 4C, 4D, 4E, 4F, and 4G illustrate a MEMS device in another embodiment of the invention.

FIG. 4A illustrates a MEMS scanning mirror device 400 in one embodiment of the invention. Device 400 includes a top layer 402 bonded atop but electrically insulated from a bottom layer 404.

Figure 4B:
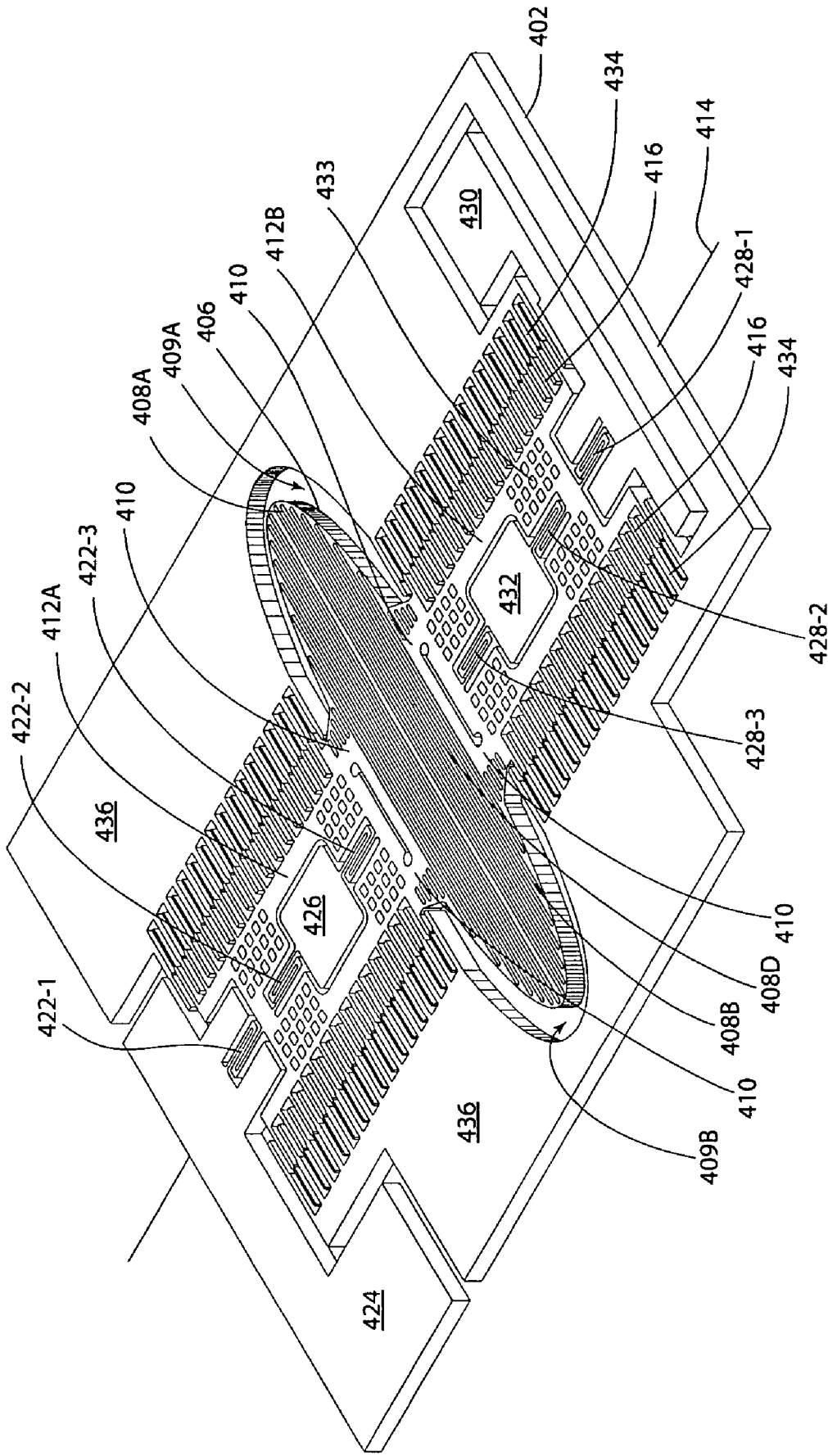
Figure 4C:
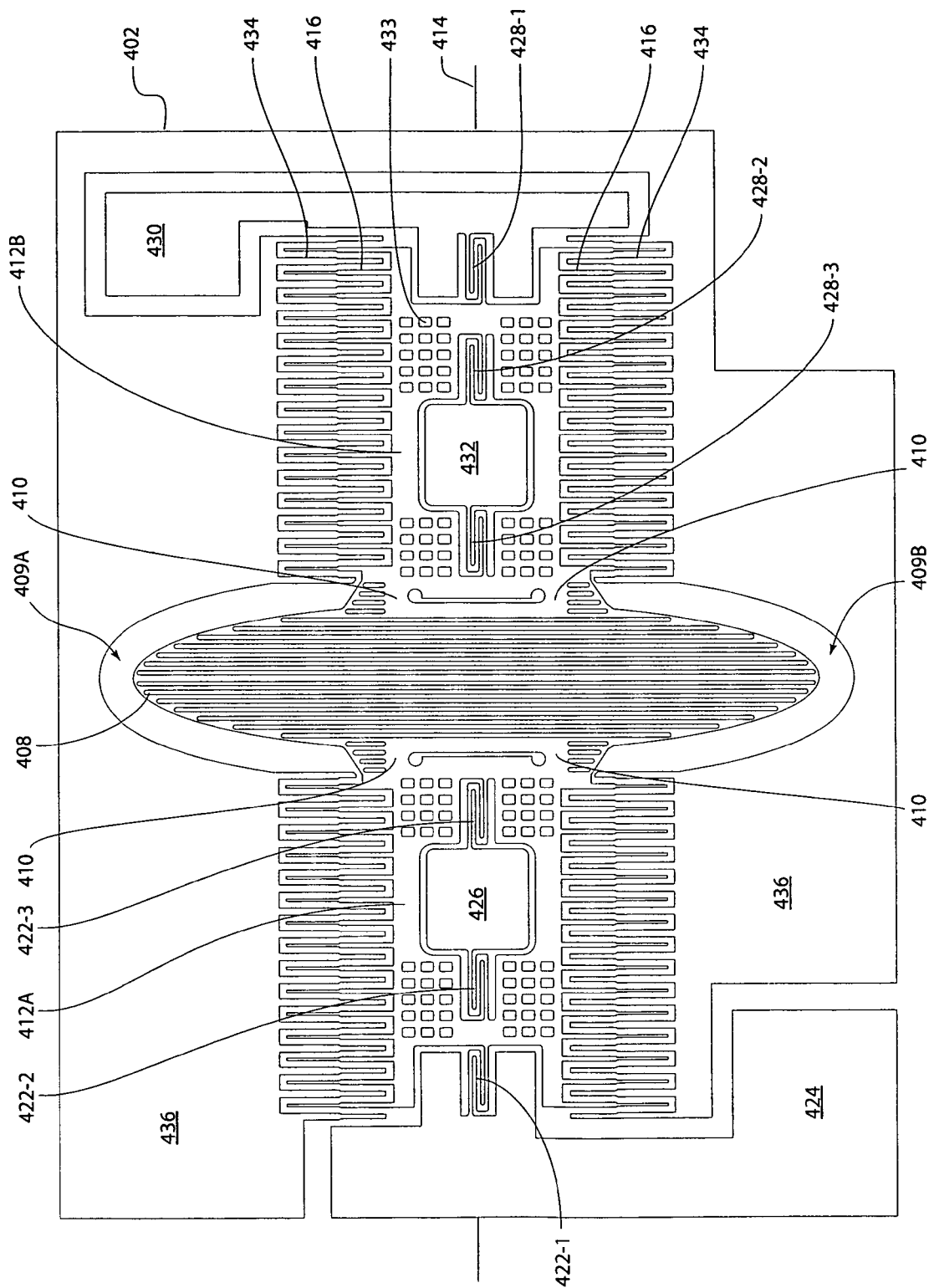
Figure 4D:
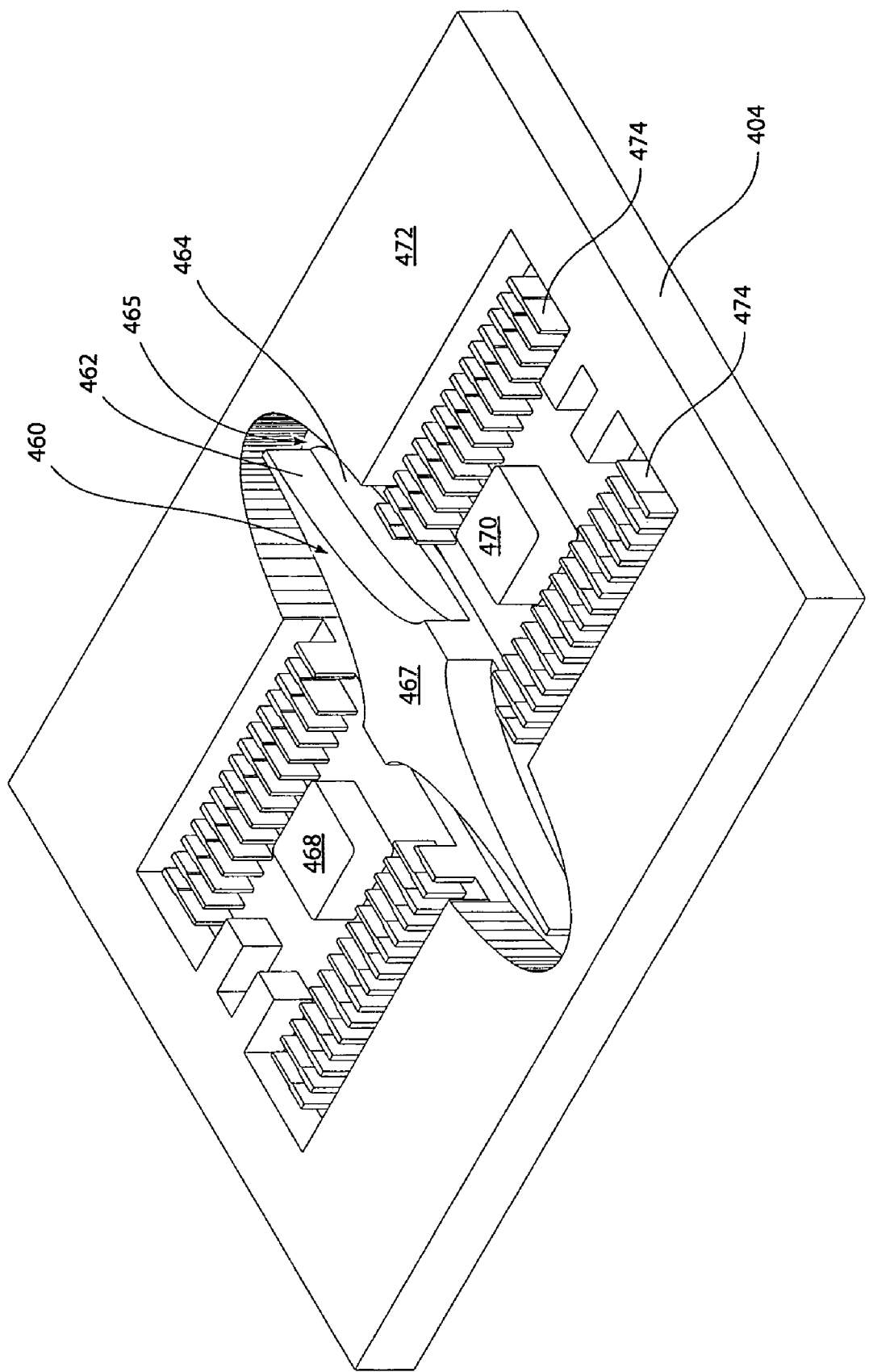

FIGS. 4B and 4C illustrate the details of top layer 402. Top layer 402 includes a top mirror layer 406 having an oblong shape. Top mirror layer 406 includes trenches/grooves 408 on its top surface. Trenches 408 reduce the mass of top mirror layer 406, which in turn minimizes the total dynamic deformation. By minimizing the total dynamic deformation, the optical resolution of device 400 is improved. Although shown to run along the entire top surface, trenches 408 may be most effective when placed along the outer perimeter of top mirror layer 406 away from a rotational axis 414. As described later, trenches 408 can be etched at the same time as other components by controlling their width so they are not etched through top mirror layer 406. Alternatively, a shadow mask can be used to protect top mirror layer 406 during etching to prevent trenches 408 from etching through. The positions and the number of trenches 408 can be refined through finite element analysis. Gaps 409A and 409B separate top mirror layer 406 from the surrounding components in top layer 402. As described later, the width of gaps 409A and 409B is designed to be greater than the widths of the gaps around more fragile components so that any trapped gas can escape around top mirror layer 406 instead of the fragile components during the etching process.

Opposing sides of top mirror layer 406 are connected by multiple support attachments 410 to the proximate ends of beam-like structures 412A and 412B. By connecting top mirror layer 406 at multiple locations to beams 412A and 412B, the dynamic deformation of top mirror layer 406 is minimized. The positions and the number of support attachments 410 can be refined through finite element analysis.

Opposing sides of beams 412A and 412B about a rotational axis 414 are connected to rotational comb teeth 416. Rotational comb teeth 416 each has a tapered body that consists of an end rectangular section that has a smaller cross-section than a base rectangular section. By reducing the size and thus the weight of rotational comb teeth 416 at its ends, the inertia of the entire structure is reduced. By reducing the structural inertia, the scanning speed can be increased or/and the driving voltage can be reduced. In one embodiment, rotational comb teeth 416 provide the electrostatic biasing force used to increase the driving efficiency of the movable structure by tuning its modal frequency. In another embodiment, rotational comb teeth 416 provide the electrostatic driving force to driver the mirror. In yet another embodiment, rotational comb teeth 416 provide both the electrostatic biasing force and the electrostatic driving force.

Beams 412A and 412B are connected by serpentine springs to bonding pads mounted atop bottom layer 404. Specifically, beam 412A has a distal end connected by a serpentine spring 422-1 to a bonding pad 424, and a midsection connected by serpentine springs 422-2 and 422-3 to a bonding pad 426 formed within beam 412A. Similarly, beam 412B has a distal end connected by a serpentine spring 428-1 to a bonding pad 430, and a midsection connected by serpentine springs 428-2 and 428-3 to a bonding pad 432 formed within beam 412B. Thus, beams 412A and 412B are connected by springs in a distributed manner along rotational axis 414 of top mirror layer 406. Beams 412A and 412B may include holes 433 to reduce their mass.

By carefully adjusting the distribution of the stiffness and location of the springs, all modal frequencies of the movable structure can be effectively separated and the desired rotational mode can be designed at the lowest resonance frequency. Since the main resonant frequency is the lowest and far apart from other structural modal frequencies, the mirror rotation will not excite any other undesired vibration mode. By using multiple springs, the maximum stress and strain on each spring are lower than conventional scanning mirror designs supported by only a pair of torsional beams. Since the stress and strain on each spring are reduced, the reliability of each spring is improved and the rotational angle is increased.

Top layer 402 may include stationary comb teeth 434 that are interdigitated in-plane with rotational comb teeth 416. Stationary comb teeth 434 may have a tapered body like rotational comb teeth 416. In one embodiment, stationary comb teeth 434 provide the electrostatic biasing force used to increase the driving efficiency of the movable structure by tuning its modal frequency. In another embodiment, stationary comb teeth 434 provide the electrostatic driving force to drive top mirror layer 406. In yet another embodiment, stationary comb teeth 434 provide both the electrostatic biasing force and the electrostatic driving force. Stationary comb teeth 434 are connected to bond pad 436 mounted atop bottom layer 404.

Figure 4E:
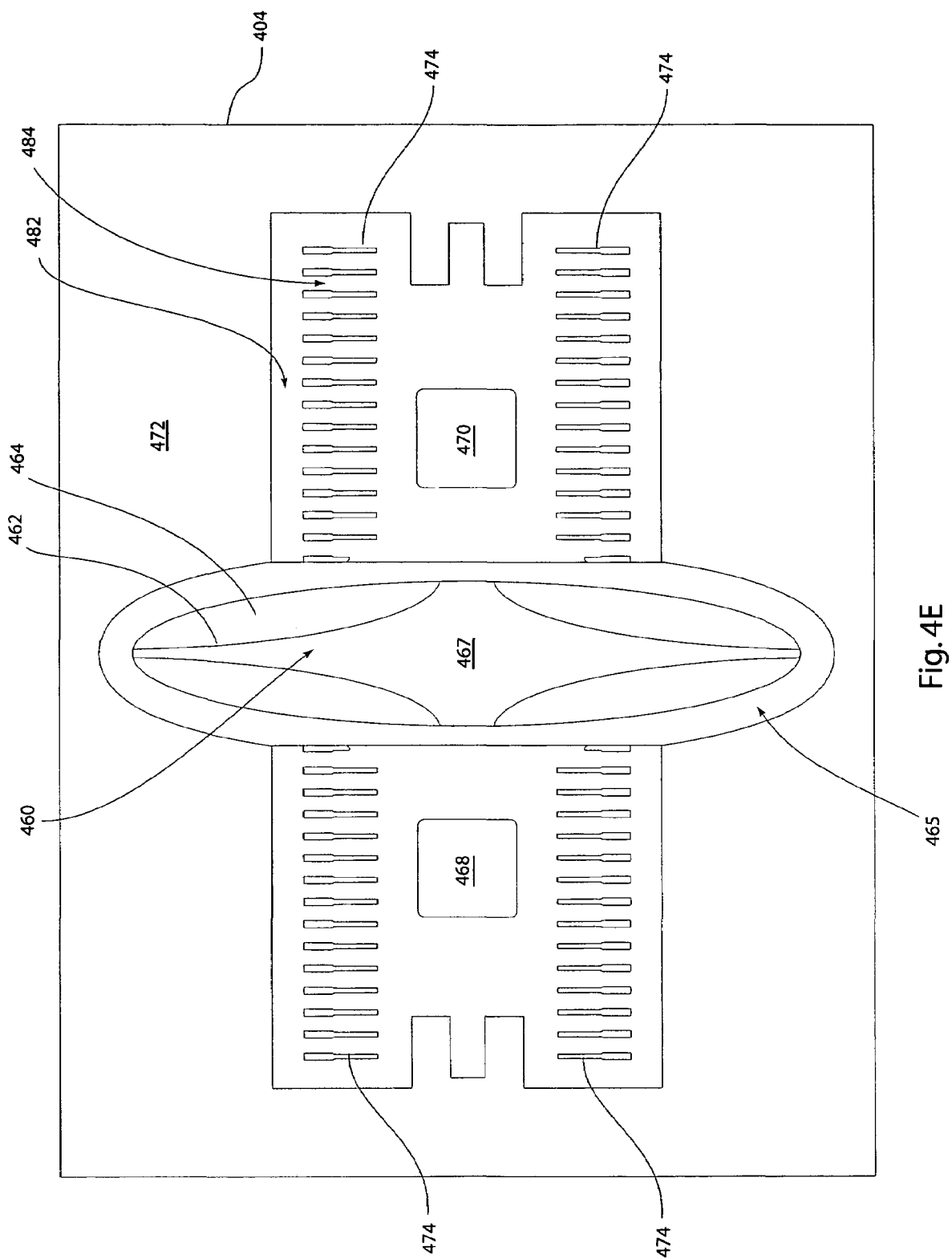
Figure 4F:
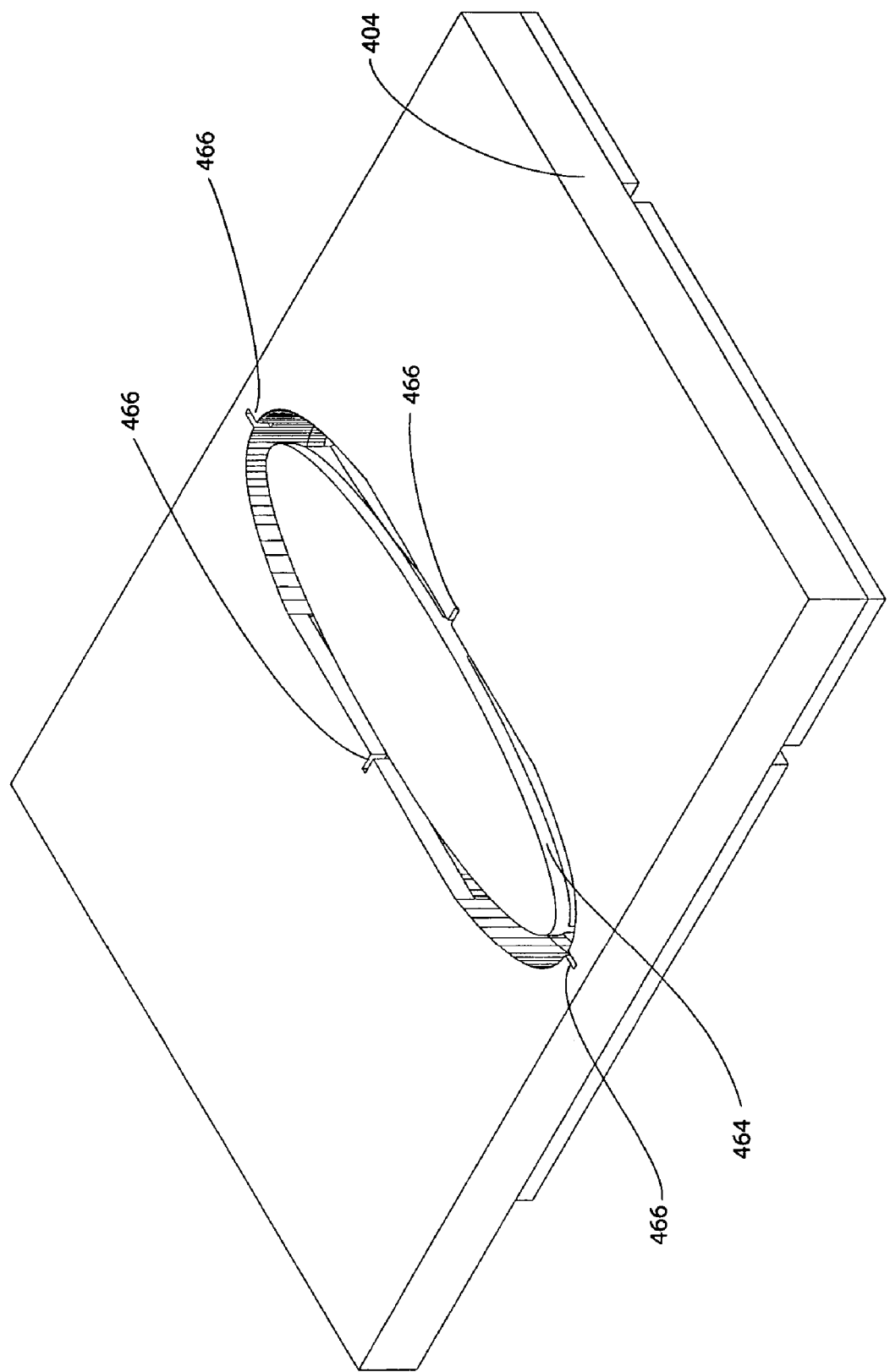
Figure 4G:
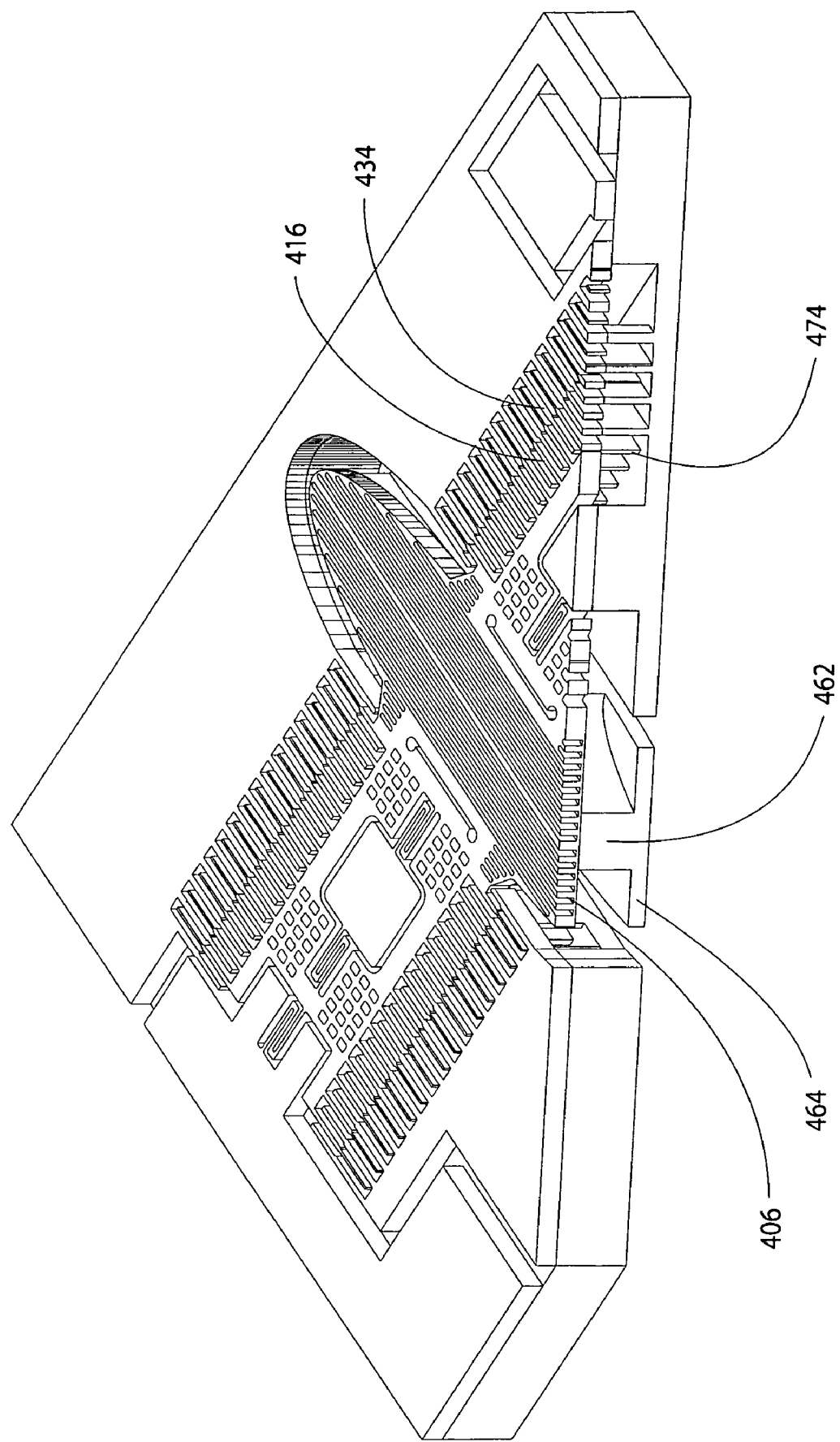

FIGS. 4D, 4E, 4F, and 4G illustrate the details of bottom layer 404. Bottom layer 404 includes a bottom mirror layer 460 having a protrusion 462 from an oblong plate 464. A gap 465 separates bottom mirror layer 460 from the surrounding components in bottom layer 404. As shown in FIG. 4F, the bottom surface of plate 464 serves as the reflecting surface and other structures can be aligned with the mirror using assembly alignment marks 466 on the bottom surface of bottom layer 404. The top surface 467 of bottom mirror layer 460 is bonded with the bottom surface of top mirror layer 406 to form the final mirror. As shown in FIG. 4G, the final mirror has an I-beam like structure where top mirror layer 406 forms the top flange, protrusion 462 forms the web, and plate 464 forms the bottom flange. The I-beam like structure removes most of the mirror mass and stiffens the mirror structure. Therefore, it minimizes the dynamic deformation of the bottom mirror surface. By minimizing the total dynamic deformation of bottom mirror surface, the optical resolution of device 400 is improved. The shape of the I-beam like structure can be refined through finite element analysis.

Bottom layer 404 includes surfaces for anchoring the bonding pads of the movable structure in top layer 402. Specifically, anchoring pads 468 and 470 provide surfaces for mounting corresponding bonding pads 426 and 432, and anchoring pad 472 provides a surface for mounting bonding pads 424, 430, and 436.

Bottom layer 404 includes stationary comb teeth 474 that are out-of-plane interdigitated with rotational comb teeth 416. In other words, they are interdigitated when viewed from above or when the final mirror is rotated. Stationary comb teeth 474 may have a tapered body like comb teeth 416 and 434. Referring to FIG. 4E, a gap 482 is provided between stationary comb teeth 474 and anchoring pad 472. Gap 482 has a width greater than gaps 484 between adjacent stationary comb teeth 474 so that gap 482 is etched deeper into bottom layer 404 than gaps 484. A deeper gap 482 allows rotational comb teeth 416 to rotate at a greater angle without contacting bottom layer 404. In one embodiment, stationary comb teeth 474 provide the electrostatic driving force to drive the final mirror. In another embodiment, stationary comb teeth 474 provide the electrostatic biasing force used to increase the driving efficiency of the movable structure. In another embodiment, stationary comb teeth 474 provide both the electrostatic driving force and the electrostatic biasing force. In yet another embodiment, the capacitance between rotational comb teeth 416 and stationary comb teeth 474 is sensed to determine the rotational position of the mirror.

Figure 5:
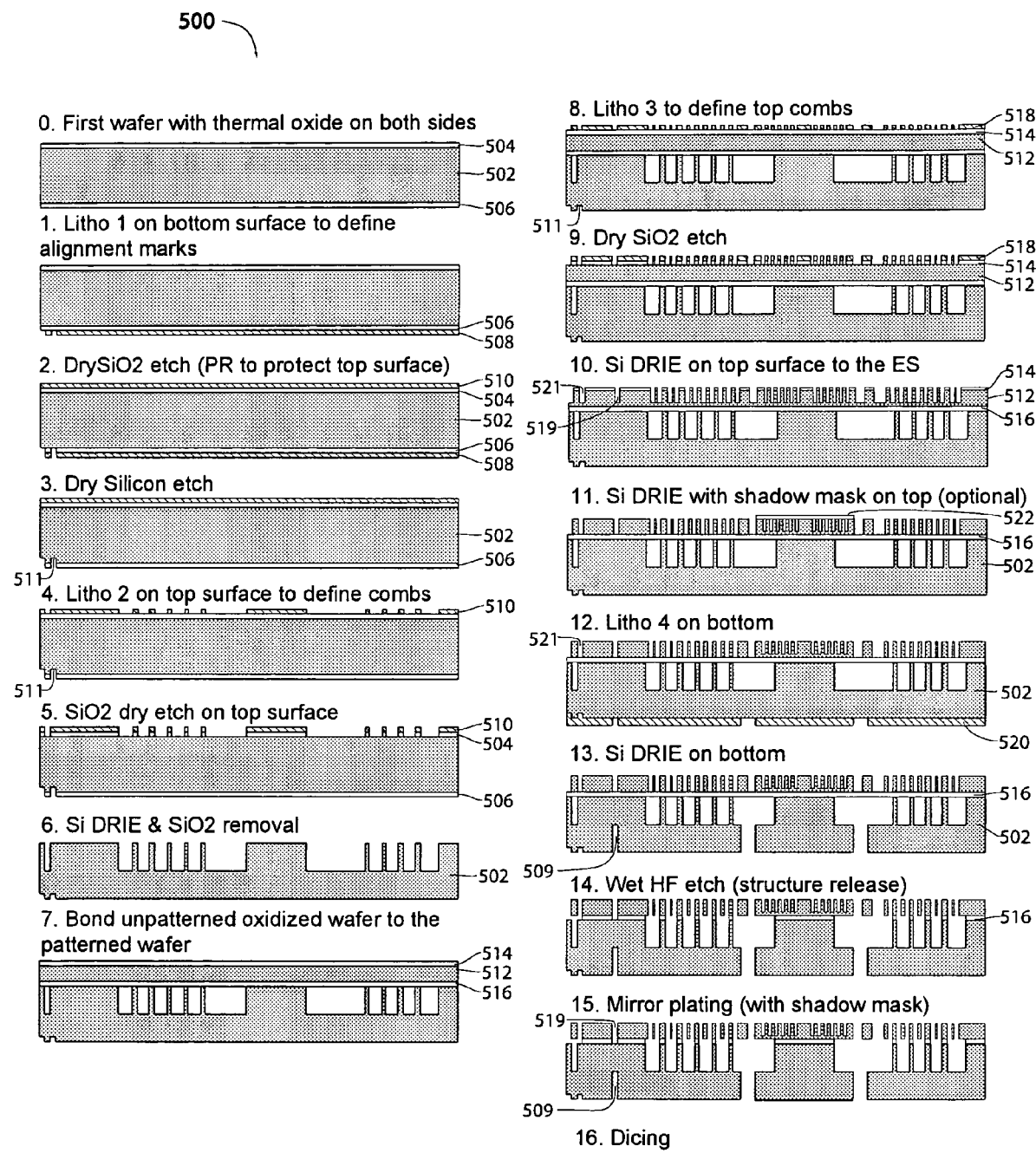
FIG. 5 illustrates process for manufacturing the device of FIG. 4A in one embodiment of the invention.

FIG. 5 illustrates a method 500 for making device 400 in one embodiment of the invention. The process starts at a step 0 with a silicon wafer 502 having a silicon dioxide layer 504 formed on the top surface and a silicon dioxide layer 506 formed on the bottom surface. Wafer 502 is used to form bottom layer 404 (FIG. 4E) of device 400.

In step 1, a photoresist 508 is deposited on oxide layer 506, exposed, and developed in a lithographic process to define one or more lithographic alignment marks 511 (shown in step 3).

In step 2, the bottom surface of wafer 502 is etched to remove portions of oxide layer 506 left unprotected by photoresist 508. In one embodiment, oxide layer 506 is dry etched. The top surface of wafer 502 is deposited with a photoresist 510 to protect it from the etching of the bottom surface.

In step 3, the bottom wafer surface of wafer 502 is etched to remove portions of wafer 502 left unprotected by oxide layer 506 to form lithography alignment marks 511. After the silicon dry etch, the remaining photoresists 508 and 510 are stripped.

In step 4, photoresist 510 is reapplied and is exposed and developed in a lithographic process to define bottom mirror layer 460 (FIG. 4E), surfaces 468, 470, and 472 (FIG. 4E), and stationary comb teeth 474 (FIG. 4E) on the top surface of wafer 502. The mask used is aligned with the lithographic alignment marks 511 on the bottom wafer surface.

In step 5, the top surface of wafer 502 is etched to remove portions of oxide layer 504 left unprotected by photoresist 510. In one embodiment, oxide layer 504 is dry etched.

In step 6, the top surface of wafer 502 is etched to remove portions of wafer 502 left unprotected by oxide layer 504 to form bottom mirror layer 460 (FIG. 4E), surfaces 468, 470, and 472, and stationary comb teeth 474 (FIG. 4E). Afterwards, the remaining photoresist 510 is stripped and oxide layers 504 and 506 are removed by a wet or dry etch.

In step 7, a silicon wafer 512 is bonded to the top surface of wafer 502. Wafer 512 has a silicon dioxide layer 514 formed on the top wafer surface and a silicon dioxide layer 516 formed on the bottom wafer surface. Wafer 512 is used to form top layer 402 (FIG. 4C) of device 400. In one embodiment, wafers 512 and 502 are bonded by silicon fusion.

In step 8, a photoresist 518 is deposited on oxide layer 514, exposed, and developed in a lithographic process to define the components of top layer 402 (FIG. 4C). The mask used is aligned with lithographic alignment marks 511 on the bottom wafer surface. Also defined in step 8 are one or more lithographic alignment marks 521 (shown in step 10) and a separation trench 519 (shown in step 10). In order to etch trenches 408 (FIG. 4C), which are etched into wafer 512 at a particular depth, along with the gaps that surround the other components, which are etched through wafer 512, the dimensions of trenches 408 and the gaps of the other components are differentiated.

In step 9, the top surface of wafer 512 is etched to remove portions of oxide layer 514 left unprotected by photoresist 518. In one embodiment, oxide layer 514 is dry etched. Afterwards, the remaining photoresist 518 is stripped.

In step 10, the top surface of wafer 512 is etched to remove portions of wafer 512 left unprotected by oxide layer 514 to form the components of top layer 402 (FIG. 4C). In one embodiment, wafer 512 is etched using a DRIE process down to the etch stop formed by oxide layer 516. When the top of device 400 is etched through, gas trapped between the bonded wafers 502 and 512 may escape and damage fragile components such as the comb teeth. To prevent such damage, gaps 409A and 409B (FIG. 4C) around top mirror layer 406 (FIG. 4C) are designed to be larger than the gaps around the other components so that oxide layer 516 beneath gaps 409A and 409B is etched through before the other gaps. This allows the air to escape around top mirror layer 406, which is a structurally strong component.

In step 11, the top surface of the mirror is protected by a shadow mask surface 522 to prevent the top mirror layer 406 from being etched through. This step is optional if inertia-reducing trenches 408 have a width that is smaller than other gaps so they are not etched through. However, the shadow mask may be preferred to create inertia-reducing trenches 408 having greater width, thereby removing more mass and further reducing the inertia of the rotating structure.

In step 12, a photoresist 520 is deposited on the bottom surface of wafer 502, exposed, and developed on the bottom surface of wafer 502 to define assembly alignment marks 466 (FIG. 4F), separation trench 509 (shown in step 13), and gap 465 (FIG. 4E) for separating bottom mirror layer 460 (FIG. 4E) from bottom layer 404 (FIG. 4E). The mask used is aligned with lithographic alignment marks 521 on the top wafer surface.

In step 13, the bottom surface of wafer 502 is etched to remove portions of wafer 502 left unprotected by photoresist 520 to form assembly alignment marks 466 (FIG. 4F) and separation trench 509, and to separate bottom mirror layer 460 (FIG. 4E) from layer 404 (FIG. 4E). In one embodiment, wafer 502 is etched using a DRIE process.

In step 14, portions of oxide layer 516 are removed from the structure to release the various components of device 400 while maintaining the bonds between the corresponding bonding and anchoring pads. In one embodiment, portions of oxide layer 516 are removed using a hydrofluoric acid wet etch.

In step 15, the bottom surface of bottom mirror layer 460 (FIG. 4F) is deposited with a reflective material (e.g., aluminum) to create a mirror surface. In one embodiment, a shadow mask is used to define areas to be deposited with the reflective material.

In step 16, devices 400 made from wafers 502 and 512 are singulated. In one embodiment, wafers 502 and 512 are singulated by dicing through separation trenches 509 and 519 (shown in step 15).

Referring to FIG. 4A, the operation of device 400 in one embodiment is explained hereafter. Rotational comb teeth 416 are coupled via bonding pad 424 to receive a reference voltage from a voltage source 476 (e.g., ground). Stationary comb teeth 434 are coupled via bonding pad 436 to receive a steady voltage from a voltage source 478 (e.g., a DC voltage source). Stationary comb teeth 474 (FIGS. 4D and 4E) are coupled via bonding pad 472 to receive an oscillating voltage from a voltage source 480 (e.g., an AC voltage source). Thus, a steady voltage difference between rotational comb teeth 416 and stationary comb teeth 434 changes the natural frequency of device 400, whereas an AC voltage difference between rotational comb teeth 416 and stationary comb teeth 474 (FIGS. 4D and 4E) oscillates the mirror at the desired scanning frequency and at the desired scanning angle.

Figure 4H:
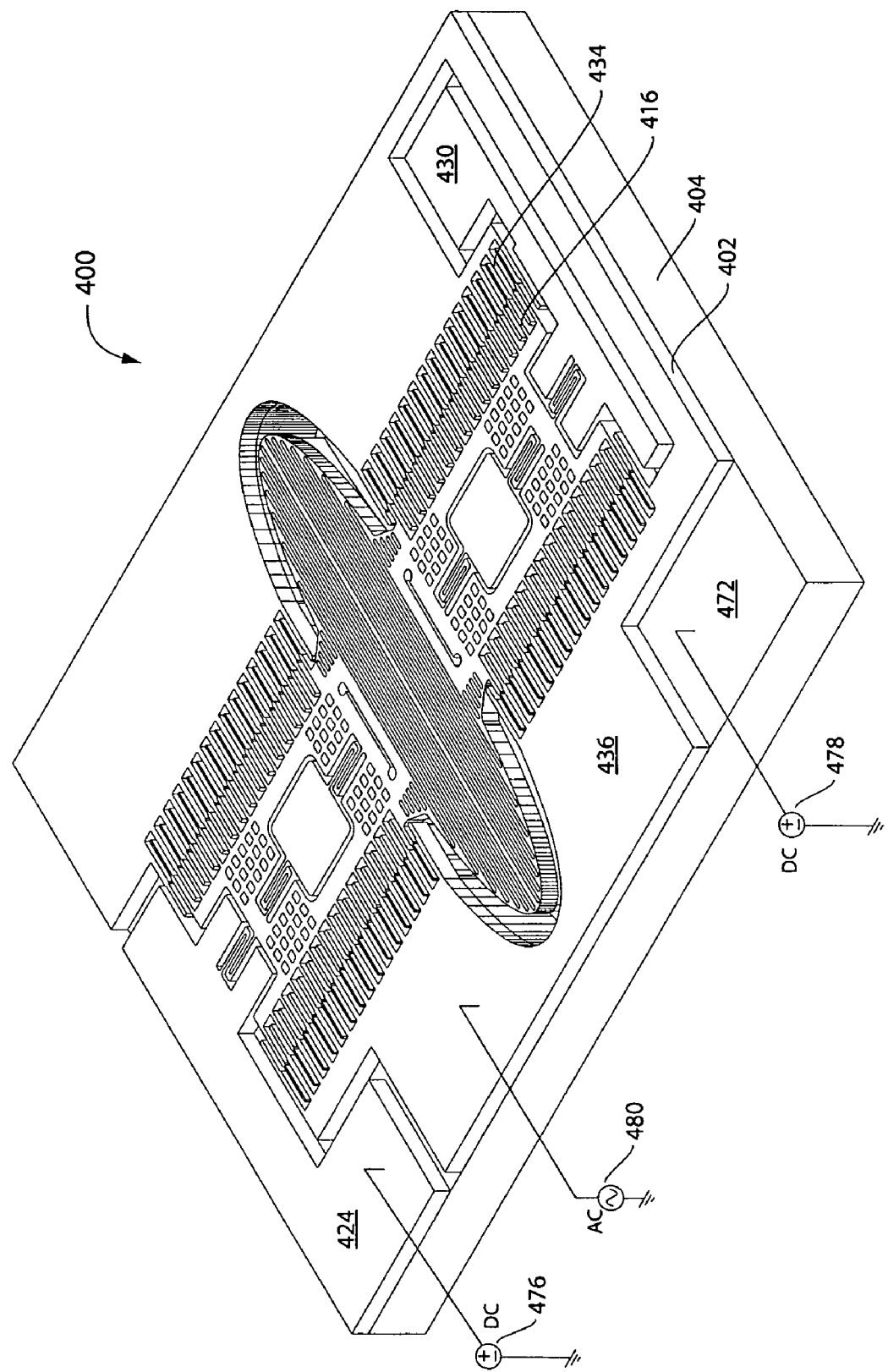
FIGS. 4H, 4I, 4J, and 4K illustrate the MEMS device of FIG. 4A with different power schemes in embodiments of the invention.

Referring to FIG. 4H, the operation of device 400 in another embodiment is explained hereafter. Rotational comb teeth 416 are coupled via bonding pad 424 to receive a steady voltage from voltage source 476 (e.g., a DC voltage source). Stationary comb teeth 434 are coupled via bonding pad 436 to receive an oscillating voltage from AC voltage source 480. Stationary comb teeth 474 (FIGS. 4D and 4E) are coupled via bonding pad 472 to receive a steady voltage from DC voltage source 478. Between rotational comb teeth 416 and stationary comb teeth 434, a steady voltage difference changes the natural frequency and the rotation amplitude of device 400 while an AC voltage difference oscillates the mirror at the desired scanning frequency and at the desired scanning angle. Furthermore, a steady voltage difference between rotational comb teeth 416 and stationary comb teeth 474 (FIGS. 4D and 4E) can also be used to change the amplitude of the rotational angle of device 400. The capacitance between rotational comb teeth 416 and stationary comb teeth 474 can also be sensed through respective bonding pads 436 and 472 to determine the rotational angle of device 400.

Figure 4I:
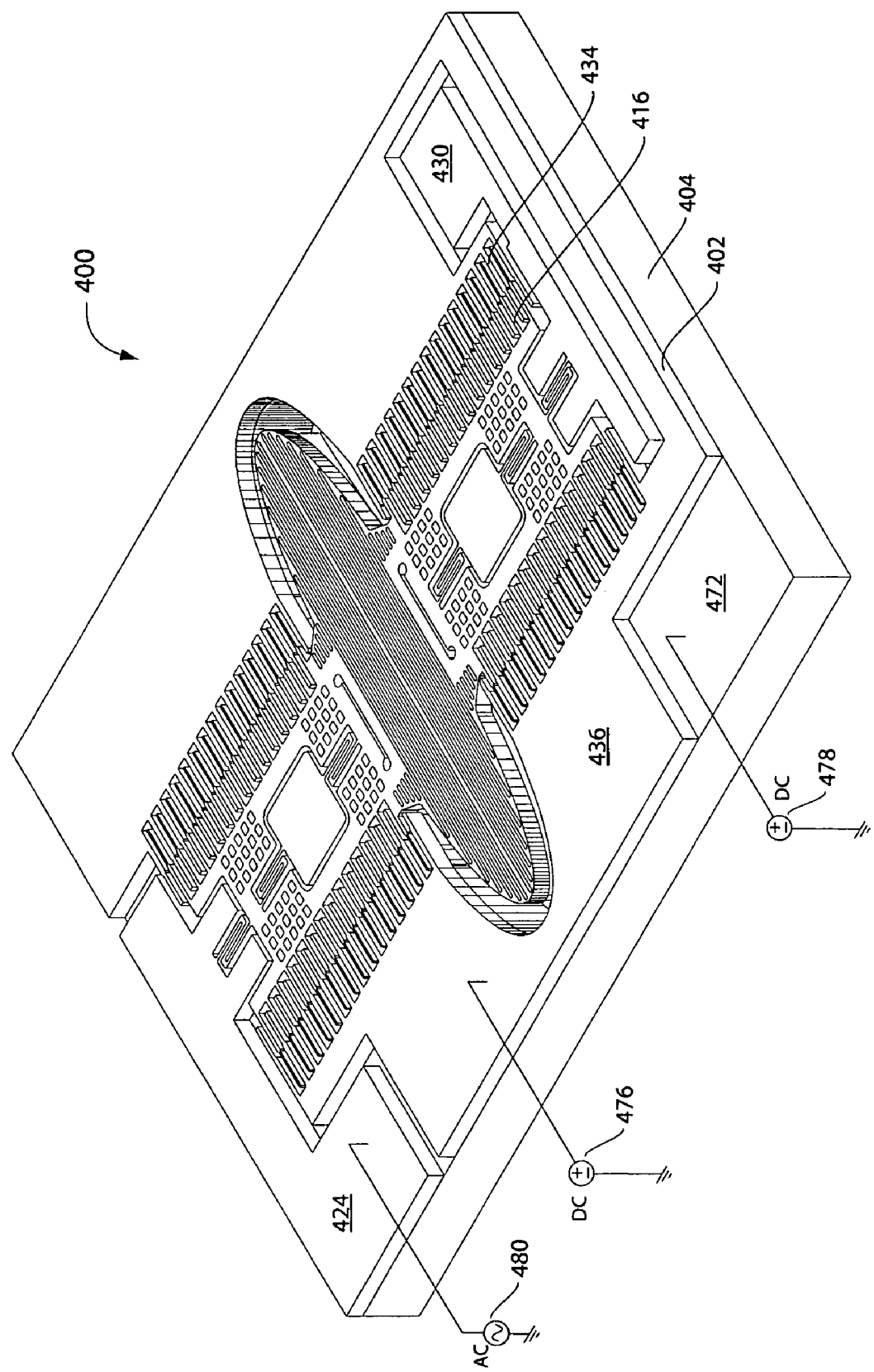
Figure 4J:
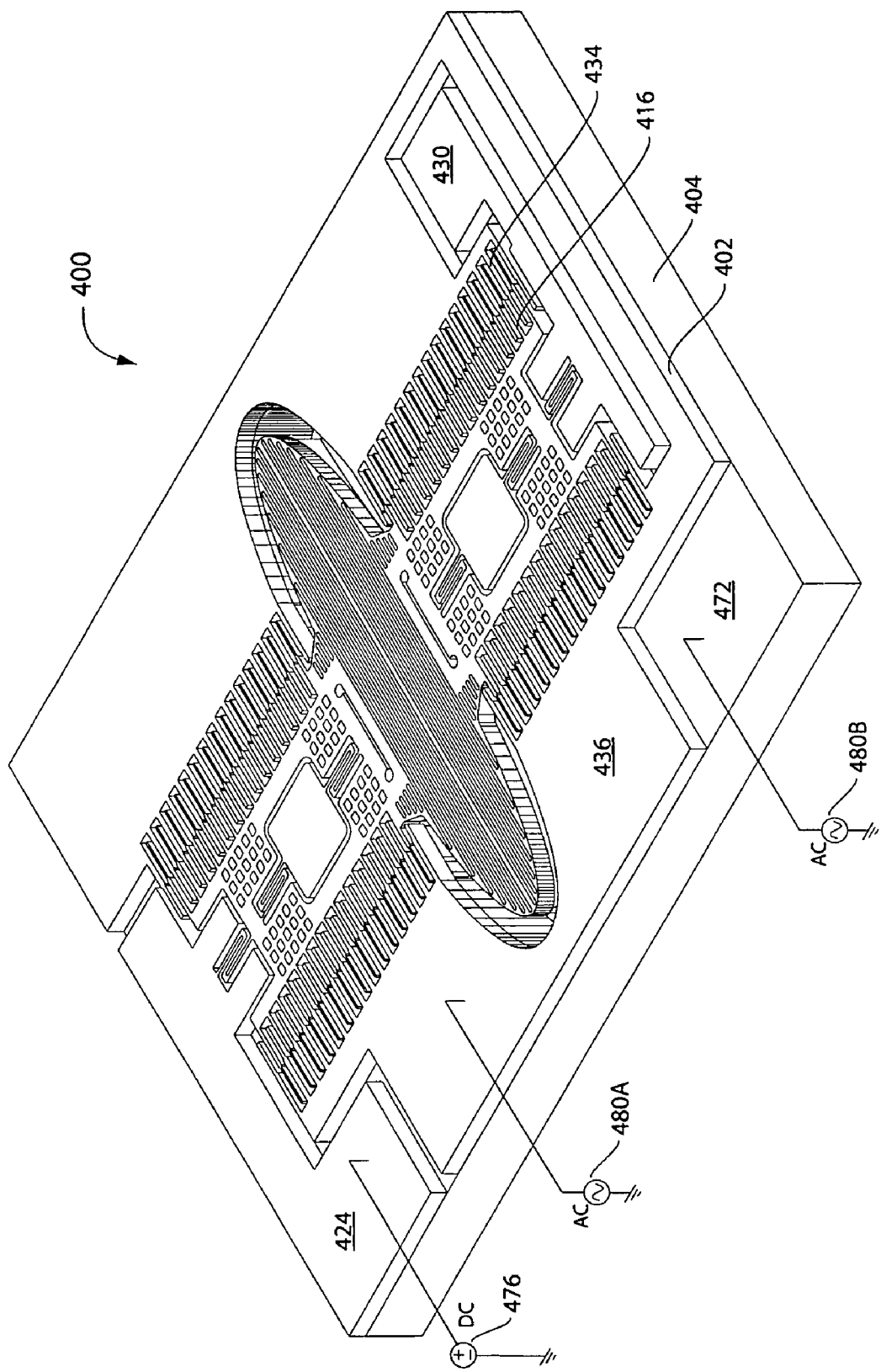

Referring to FIG. 4I, the operation of device 400 in another embodiment is explained hereafter. Rotational comb teeth 416 are coupled via bonding pad 424 to receive an oscillating voltage from AC voltage source 480. Stationary comb teeth 434 are coupled via bonding pad 436 to receive a steady voltage from DC voltage source 476. Stationary comb teeth 474 (FIGS. 4D and 4E) are coupled via bonding pad 472 to receive a steady voltage from DC voltage source 478. Between rotational comb teeth 416 and stationary comb teeth 434, a steady voltage difference changes the natural frequency and the rotation amplitude of device 400 while an AC voltage difference between rotational comb teeth 416 and stationary comb teeth 434 oscillates the mirror at the desired scanning frequency and at the desired scanning angle. A steady voltage difference between rotational comb teeth 416 and stationary comb teeth 474 (FIGS. 4D and 4E) can also be used to change the amplitude of the rotational angle of device 400. The capacitance between rotational comb teeth 416 and stationary comb teeth 474 can also be sensed through respective bonding pads 436 and 472 to determine the rotational angle of device 400.

Figure 4K:
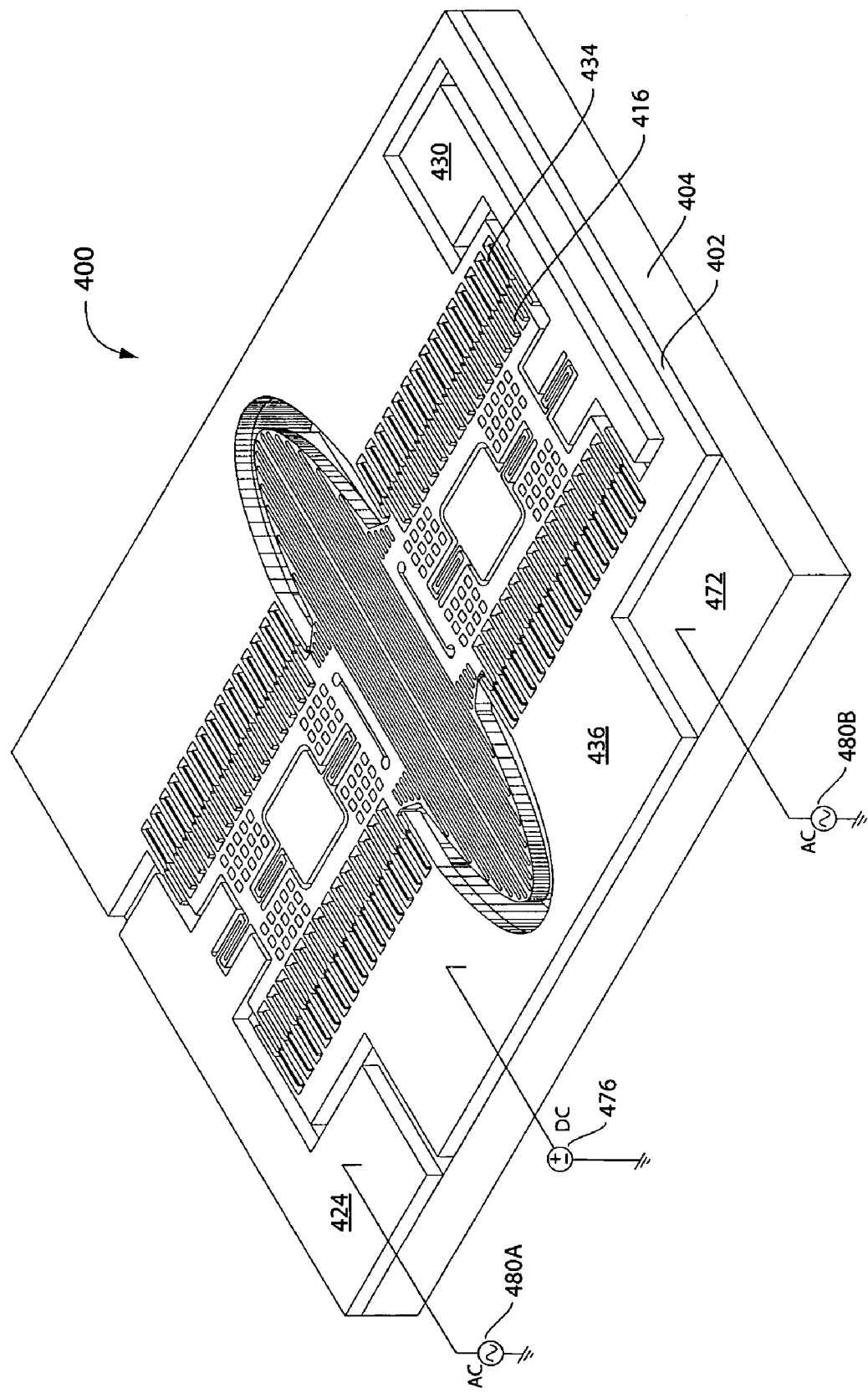

Referring to FIG. 4K, the operation of device 400 in another embodiment is explained hereafter. Rotational comb teeth 416 are coupled via bonding pad 424 to receive an oscillating voltage from AC voltage source 480A. Stationary comb teeth 434 are coupled via bonding pad 436 to receive a steady voltage from DC voltage source 476. Stationary comb teeth 474 (FIGS. 4D and 4E) are coupled via bonding pad 472 to receive an oscillating voltage from AC voltage source 480B. Between rotational comb teeth 416 and stationary comb teeth 434, a DC voltage difference changes the natural frequency and the rotation amplitude of device 400 while an AC voltage difference oscillates the mirror at the desired scanning frequency and at the desired scanning angle. Between rotational comb teeth 416 and stationary comb teeth 474 (FIGS. 4D and 4E), a DC voltage difference can also be used to change the amplitude of the rotational angle of device 400 while an oscillating voltage difference can also be used to oscillate the mirror at the desired scanning frequency and at the desired scanning angle. The capacitance between rotational comb teeth 416 and stationary comb teeth 474 can also be sensed through respective bonding pads 436 and 472 to determine the rotational angle of device 400.

Referring to FIG. 4I, the operation of device 400 in another embodiment is explained hereafter. Rotational comb teeth 416 are coupled via bonding pad 424 to receive a steady voltage from DC voltage source 476. Stationary comb teeth 434 are coupled via bonding pad 436 to receive an oscillating voltage from an AC voltage source 480A. Stationary comb teeth 474 (FIGS. 4D and 4E) are coupled via bonding pad 472 to receive an oscillating voltage from an AC voltage source 480B. The oscillating voltage provided by AC voltage source 480B is out of phase (e.g., 180 degrees out of phase) with the oscillating voltage provided by voltage source 480A. Between rotational comb teeth 416 and stationary comb teeth 434, a steady voltage difference changes the natural frequency and the rotation amplitude of device 400 while an AC voltage difference oscillates the mirror at the desired scanning frequency and at the desired scanning angle. An AC voltage difference between rotational comb teeth 416 and stationary comb teeth 474 (FIGS. 4D and 4E) can also be used to oscillate the mirror at the desired scanning frequency and at the desired scanning angle. The capacitance between rotational comb teeth 416 and stationary comb teeth 474 can also be sensed through respective bonding pads 436 and 472 to determine the rotational angle of device 400.

Figure 6A:
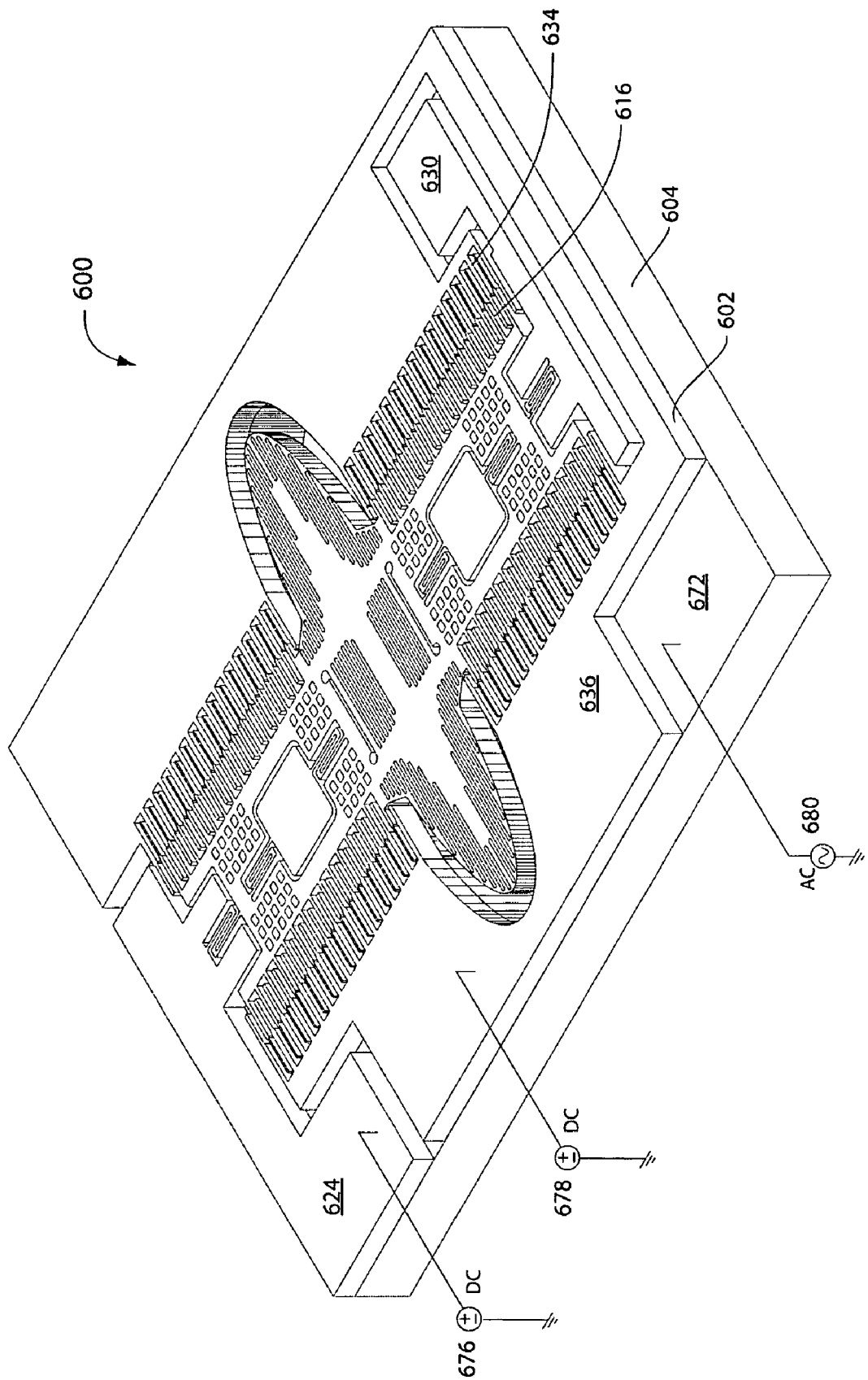
FIGS. 6A, 6B, 6C, 6D, 6E, and 6F illustrate a MEMS device in another embodiment of the invention.

FIG. 6A illustrates a MEMS scanning mirror device 600 in one embodiment of the invention. Device 600 includes a top layer 602 bonded atop but electrically insulated from a bottom layer 604.

Figure 6B:
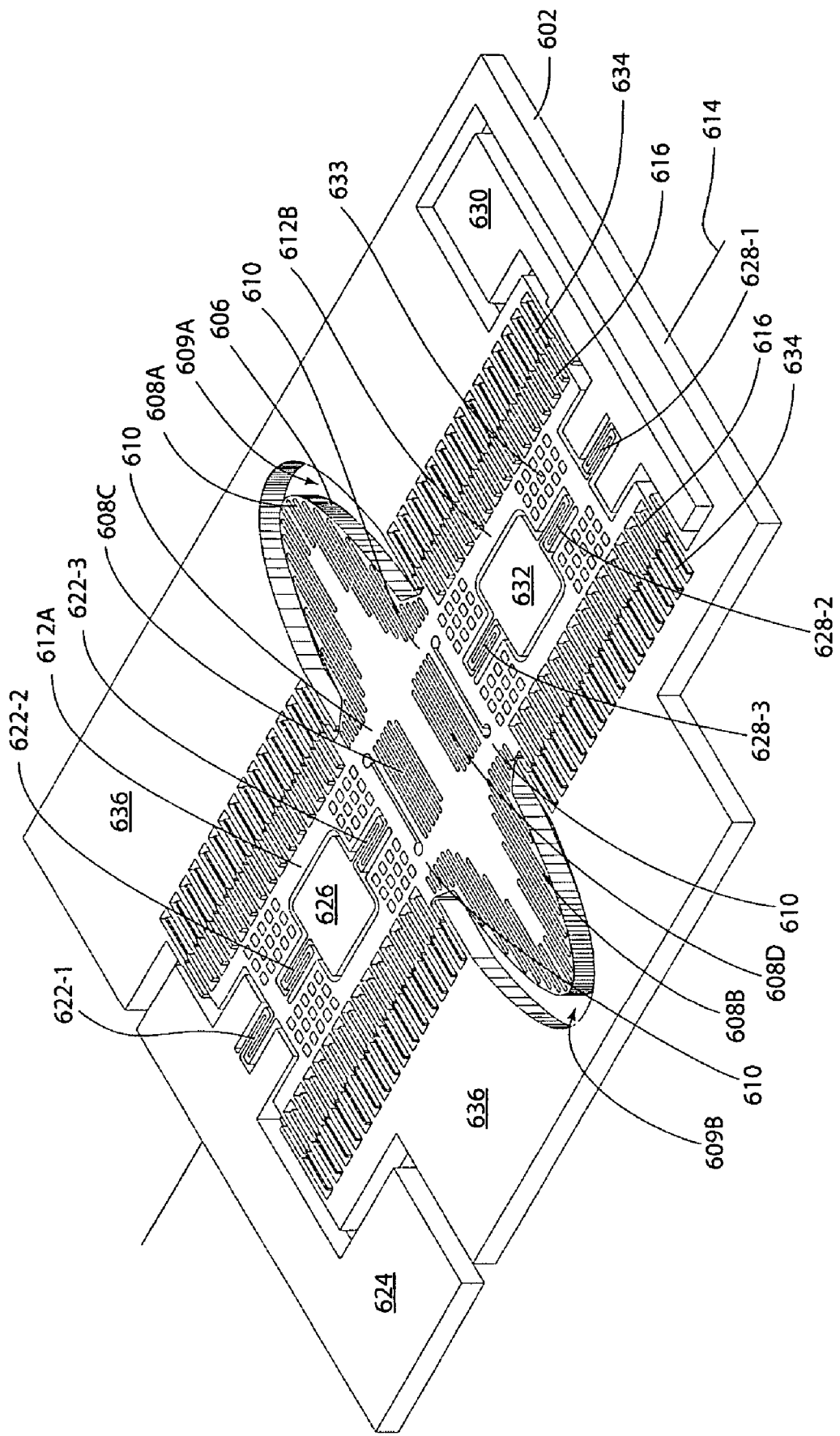
Figure 6C:
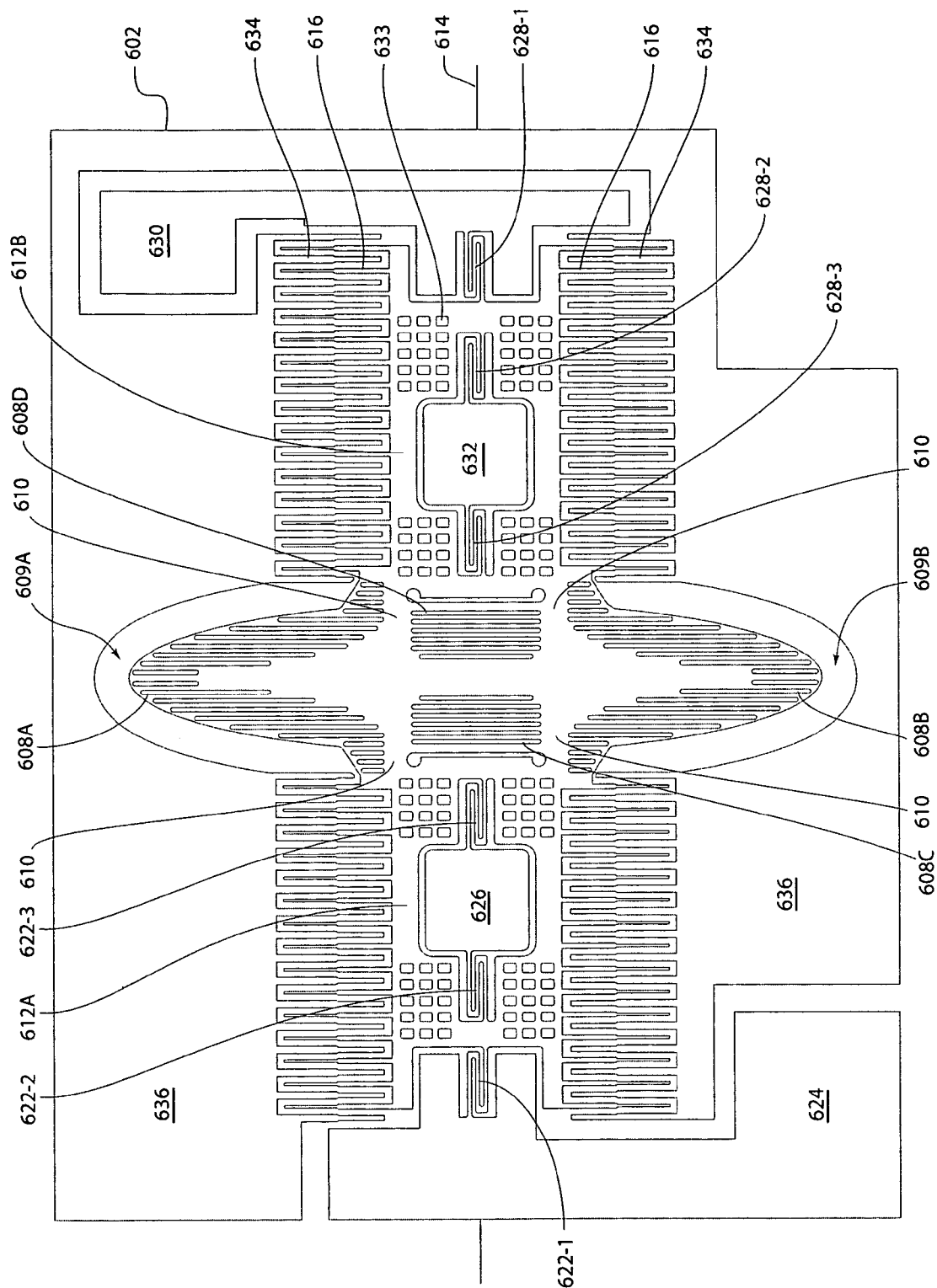

FIGS. 6B and 6C illustrate the details of top layer 602. Top layer 602 includes a mirror 606 having an oblong shape. The bottom surface of mirror 606 serves as the reflecting surface. The top surface of mirror 606 includes trenches/grooves 608A, 608B, 608C, and 608D. Trenches 608A are formed along the top outer perimeter of mirror 606 while trenches 608B are formed along the bottom outer perimeter of mirror 606. Trenches 608C and 608 are formed on the midsection of mirror 606. Trenches 608A, 608B, 608C, and 608D reduce the mass of mirror 606, which in turn minimizes the dynamic deformation of mirror 606. By minimizing dynamic deformation of mirror 606, the optical resolution of device 600 is improved. As described later, trenches 608 can be etched at the same time as other components by controlling their width so they are not etched through mirror 606. Alternatively, a shadow mask can be used to protect mirror 606 during etching to prevent trenches 608 from etching through. The mirror mass and inertia can be further reduced after the fabrication process by laser trimming. This method can adjust the mirror natural frequency. The effective place to remove the mirror mass is the area around the top and bottom outer perimeters of mirror 606. Therefore, areas on mirror 606 can be reserved for the laser trimming process.

As described later, trenches 608 can be etched at the same times as other components by controlling their width so they are not etched through mirror 606. The trenches were designed to remove the mirror mass around the mirror tips and outer diameter. This will effectively reduce the mirror inertia and reduce the mirror dynamic deformation. The positions and the number of trenches 608 can be refined through finite element analysis. Gaps 609A and 609B separate mirror 606 from the surrounding components. As described later, the width of gaps 609A and 609B is designed to be greater than the widths of gaps around more fragile components so that any trapped gas can escape around mirror 606 instead of the fragile components during the etching process.

Opposing sides of mirror 606 are connected by multiple support attachments 610 to the proximate ends of beam-like structures 612A and 612B. By connecting mirror 606 at multiple locations to beams 612A and 612B, the dynamic deformation of mirror 606 is minimized. The positions and the number of support attachments 610 can be refined through finite element analysis.

Opposing sides of beams 612A and 612B about a rotational axis 614 are connected to rotational comb teeth 616. Rotational comb teeth 616 each has a tapered body having an end rectangular section that has a smaller cross-section than a base rectangular section. By reducing the size and thus the weight of rotational comb teeth 616 at its end, the inertia of the entire structure is reduced. By reducing the structural inertia, the scanning speed can be increased or/and the driving voltage can be reduced. In one embodiment, rotational comb teeth 616 provide the electrostatic biasing force used to increase the driving efficiency of the movable structure by tuning its modal frequency. In another embodiment, rotational comb teeth 616 provide the electrostatic driving force to driver mirror 606. In yet another embodiment, rotational comb teeth 616 provide both the electrostatic biasing force and the electrostatic driving force.

Beams 612A and 612B are connected by serpentine springs to bonding pads mounted atop bottom layer 604. Specifically, beam 612A has a distal end connected by a serpentine spring 622-1 to a bonding pad 624, and a midsection connected by serpentine springs 622-2 and 622-3 to a bonding pad 626 formed within beam 612A. Similarly, beam 612B has a distal end connected by a serpentine spring 628-1 to a bonding pad 630, and a midsection connected by serpentine springs 628-2 and 628-3 to a bonding pad 632 formed within beam 612B. Thus, beams 612A and 612B are connected by springs in a distributed manner along rotational axis 614 of top mirror 606. Beams 612A and 612B may include holes 633 to reduce their mass.

By carefully adjusting the distribution of the location and stiffness of the springs, all modal frequencies of the movable structure can be effectively separated and the desired rotational mode can be designed at the lowest resonance frequency. Since the main resonant frequency is the lowest and far apart from other structural modal frequencies, the mirror rotation will not excite any other undesired vibration mode. By using multiple springs, the maximum stress and strain on each spring are lower than conventional scanning mirror designs supported by only a pair of torsional beams. Since the stress and strain on each spring are reduced, the reliability of each spring is improved and the rotational angle is increased.

Top layer 602 may include stationary comb teeth 634 that are interdigitated in-plane with rotational comb teeth 616. Stationary comb teeth 634 may have a tapered body like rotational comb teeth 616. In one embodiment, stationary comb teeth 634 provide the electrostatic biasing force used to increase the driving efficiency of the movable structure by tuning its modal frequency. In another embodiment, stationary comb teeth 634 provide the electrostatic driving force to drive mirror 606. In yet another embodiment, stationary comb teeth 634 provide both the electrostatic biasing force and the electrostatic driving force. Stationary comb teeth 634 are connected to bonding pad 636 mounted atop bottom layer 404.

Figure 6D:
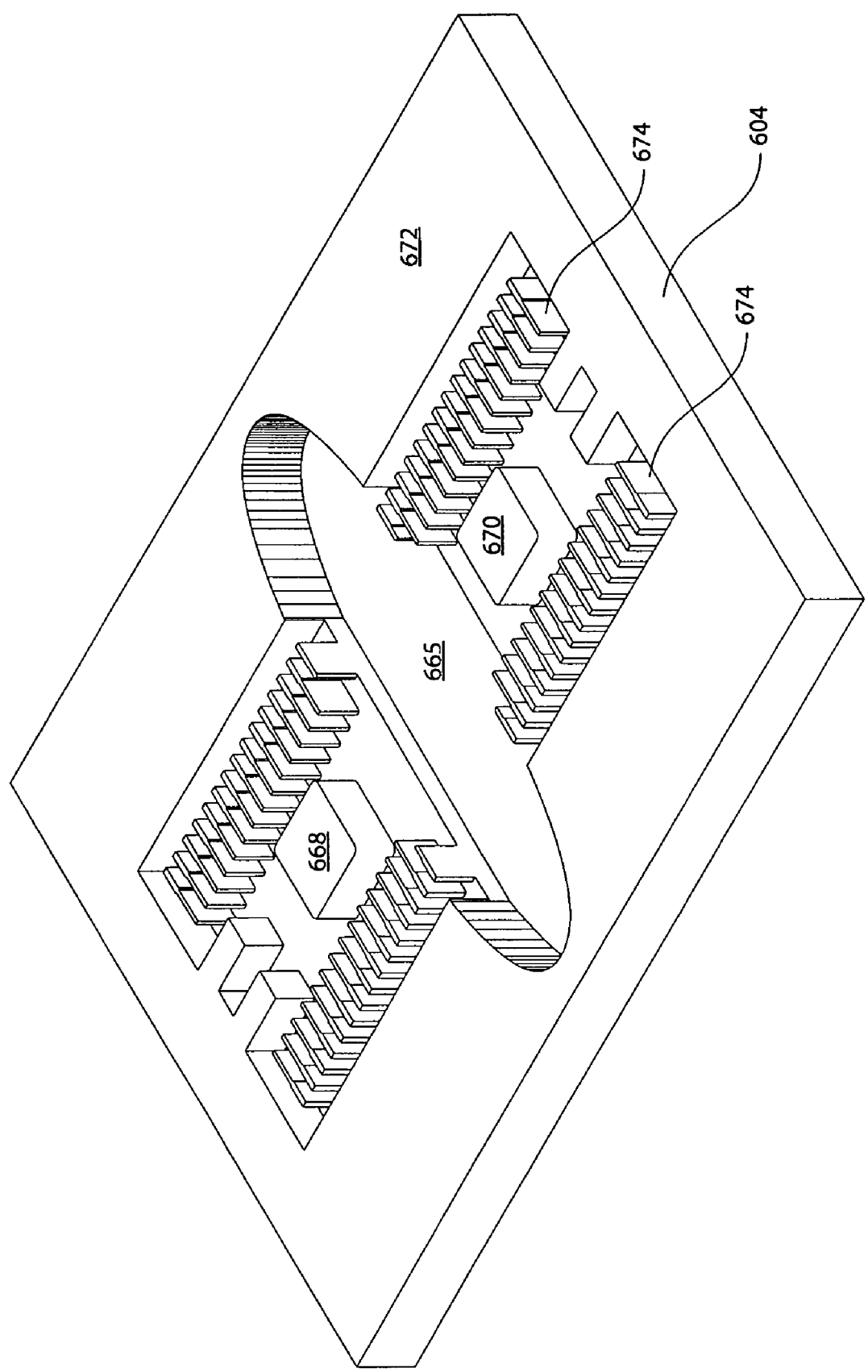
Figure 6E:
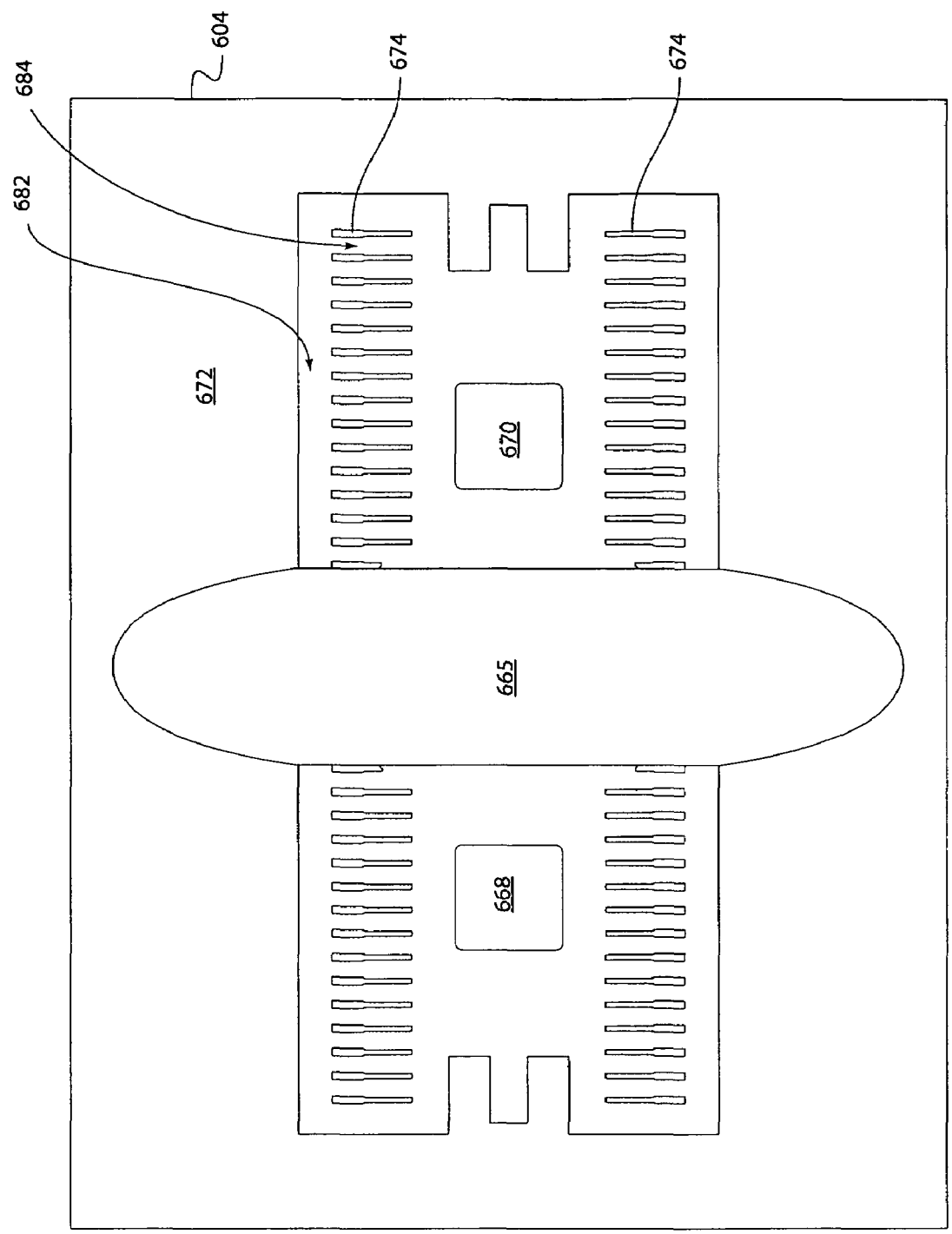
Figure 6F:
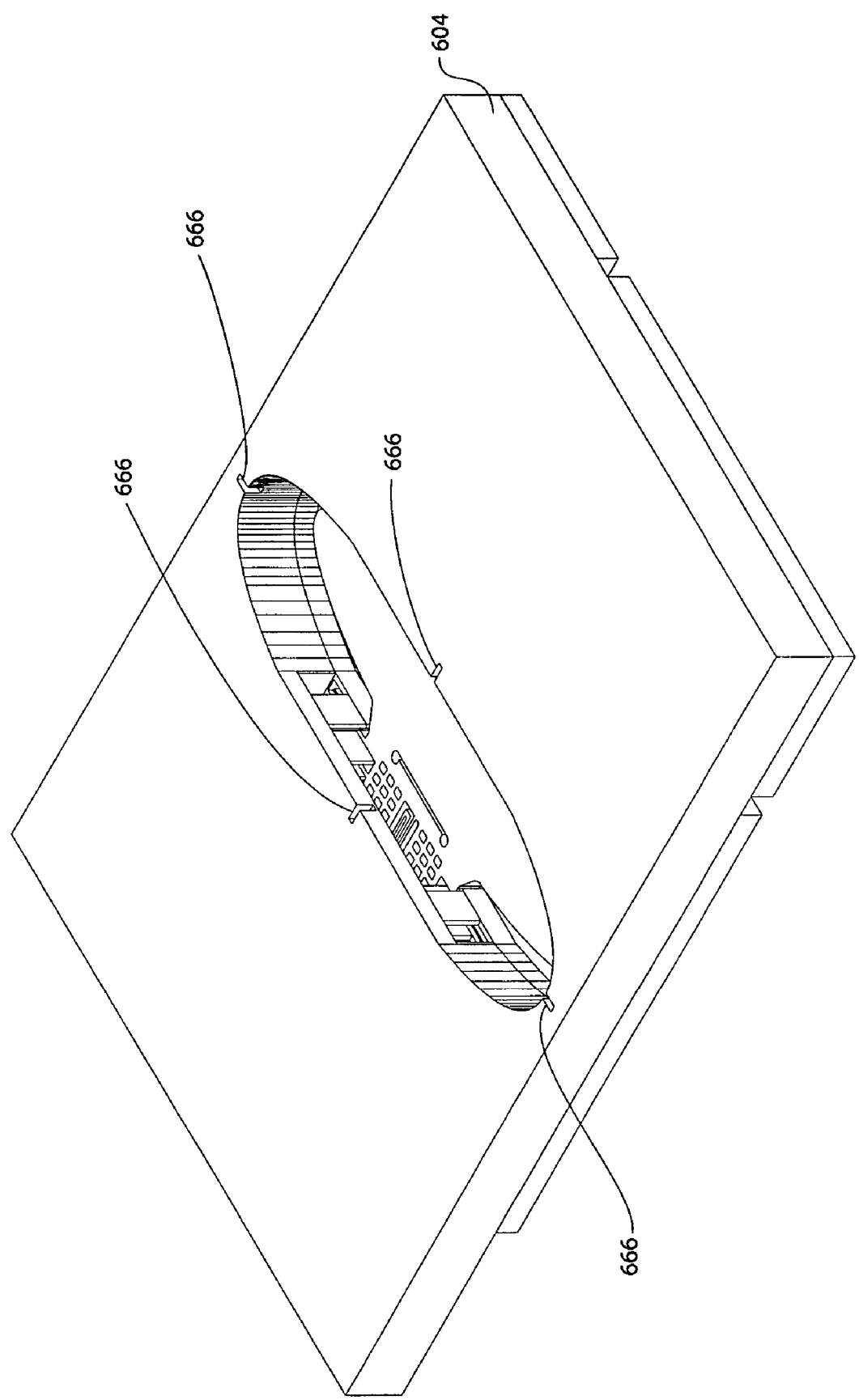

FIGS. 6D, 6E, and 6F illustrate the details of bottom layer 604. Bottom layer 604 includes an opening 665 that accommodates the rotation of mirror 606 without touching bottom layer 604. As shown in FIG. 6F, the bottom surface of bottom layer 604 includes assembly alignment marks 666 for aligning other structures with mirror 606.

Bottom layer 604 includes surfaces for anchoring the bonding pads of the movable structure in top layer 602. Specifically, anchoring pads 668 and 670 provide a surface for mounting bonding pads 626 and 632, and anchoring pad 672 provides a surface for mounting bonding pads 624, 630, 636.

Bottom layer 604 includes stationary comb teeth 674 that are interdigitated out-of-plane with rotational comb teeth 616. In other words, they are interdigitated when viewed from above. Stationary comb teeth 674 may have a tapered body like comb teeth 616 and 634. Referring to FIG. 6E, a gap 682 is provided between stationary comb teeth 674 and anchoring pad 672. Gap 682 has a greater width than gaps 684 between adjacent stationary comb teeth 674 so that gap 682 is etched deeper into bottom layer 604 than gaps 684. A deeper gap 682 allows rotational comb teeth 616 to rotate at a greater angle without contacting bottom layer 604. In one embodiment, stationary comb teeth 674 provide the electrostatic driving force to drive the final mirror. In another embodiment, stationary comb teeth 674 provide the electrostatic biasing force used to increase the driving efficiency of the movable structure. In another embodiment, stationary comb teeth 674 provide both the electrostatic driving force and the electrostatic biasing force. In yet another embodiment, the capacitance between rotational comb teeth 616 and stationary comb teeth 674 is sensed to determine the rotational position of the mirror.

Figure 7:
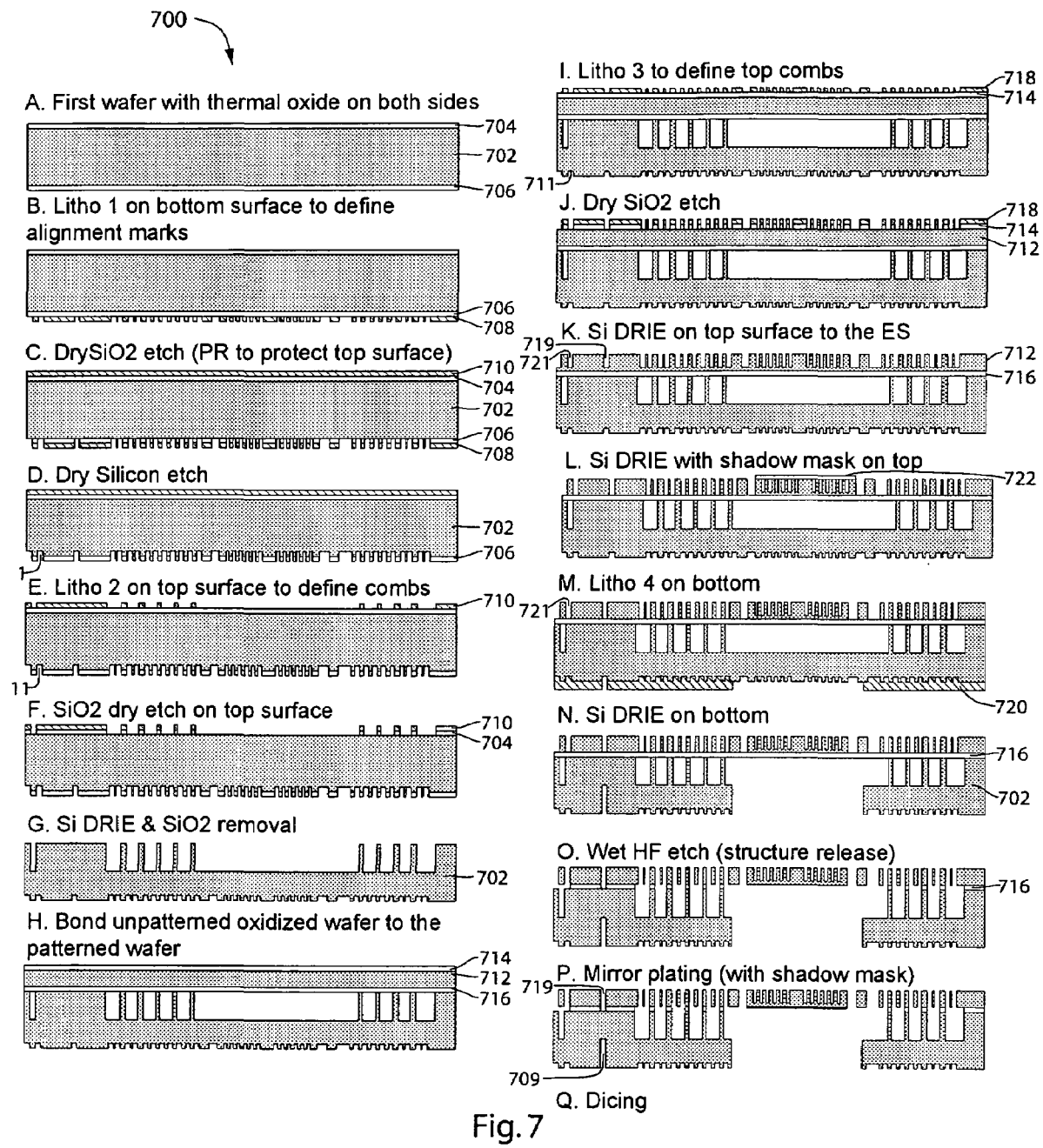
FIG. 7 illustrates process for manufacturing the device of FIG. 6A in one embodiment of the invention.

FIG. 7 illustrates a method 700 for making device 600 in one embodiment of the invention. The process starts at a step A with a silicon wafer 702 having a silicon dioxide layer 704 formed on the top wafer surface and a silicon dioxide layer 706 formed on the bottom wafer surface. Wafer 702 is used to form bottom layer 604 of device 600.

In step B, a photoresist 708 is deposited on oxide layer 706, exposed, and developed in a lithographic process to define one or more lithographic alignment marks 711 (shown in step D).

In step C, the bottom surface of wafer 702 is etched to remove portions of oxide layer 706 left unprotected by photoresist 708. In one embodiment, oxide layer 706 is dry etched. The top surface of wafer 702 is deposited with a photoresist 710 to protect it from the etching of the bottom surface.

In step D, the bottom surface of wafer 702 is etched to remove portions of wafer 702 left unprotected by oxide layer 706 to form lithographic alignment marks 711.

In step E, photoresist 710 is exposed and developed in a lithographic process to define surfaces 668, 670, and 672 (FIG. 6E), and stationary combs 674 (FIG. 6E) on the top surface of wafer 702. The mask used is aligned and exposed with the lithographic alignment marks 711 on the bottom wafer surface.

In step F, the top surface of wafer 702 is etched to remove portions of oxide layer 704 left unprotected by photoresist 710. In one embodiment, oxide layer 704 is dry etched.

In step G, the top surface of wafer 702 is etched to remove portions of wafer 702 left unprotected by oxide layer 704 to form anchoring pads 668, 670, and 672 (FIG. 6E), and stationary combs 674 (FIG. 6E). In one embodiment, wafer 702 is etched using a deep reactive ion etching (DRIE) process. Afterwards, the remaining oxide layers 704 and 706 are removed.

In step H, a silicon wafer 712 is bonded to the top surface of wafer 702. Wafer 712 has a silicon oxide layer 714 formed on the top wafer surface and a silicon dioxide layer 716 formed on the bottom wafer surface. Wafer 712 is used to form top layer 602 (FIG. 6C) of device 600. In one embodiment, wafers 712 and 702 are bonded by silicon fusion.

In step I, a photoresist 718 is deposited on oxide layer 714, exposed, and developed in a lithographic process to define the components of top layer 602 (FIG. 6C). Also defined in step I are one or more lithographic alignment marks 721 (shown in step K) and a separation trench 719 (shown in step K) In order to etch inertia-reducing trenches 608 (FIG. 6C), which are etched into wafer 712 at a particular depth, along with the gaps that surround the other components, which are etched through wafer 712, the dimensions of trenches 608 and the gaps are differentiated. The mask used is aligned and exposed with lithographic alignment marks 711 on the bottom wafer surface.

In step J, the top surface of wafer 712 is etched to remove portions of oxide layer 714 left unprotected by photoresist 718. In one embodiment, thermal oxide layer 714 is dry etched.

In step K, the top surface of wafer 712 is etched to remove portions of wafer 712 left unprotected by oxide layer 714 to form the components of top layer 602 (FIG. 6C), alignment marks 721 and separation trench 719. In one embodiment, wafer 712 is etched using a DRIE process down to the etch stop formed by oxide layer 716. When the top of device 600 is etched through, gas trapped between the bonded wafers 702 and 712 may escape and damage fragile components such as the comb teeth. To prevent such damage, gaps 609A and 609B (FIG. 6C) around mirror 606 (FIG. 6C) are designed to be larger than the gaps around the other components so that oxide layer 716 beneath gaps 609A and 609B is etched through before the other gaps. This allows the air to escape around mirror 606, which is a structurally strong component.

In step L, the top surface of the mirror is protected by a shadow mask surface 722 to prevent the top mirror layer from being etched through. This step is optional if inertia-reducing trenches 608 have a width that is smaller than other gaps so they are not etched through. However, the shadow mask may be preferred to create inertia-reducing trenches 608 having greater width, thereby removing more mass and further reducing the inertia of the rotating structure.

In step M, a photoresist 720 is deposited on the bottom surface of wafer 702, exposed, and developed on the bottom wafer surface of wafer 702 to define opening 665 (FIG. 6E) for mirror 606 (FIG. 6C). The mask used is aligned and exposed with lithographic alignment marks 721 on the top surface.

In step N, the bottom surface of wafer 702 is etched to remove portions of wafer 702 left unprotected by photoresist 720 to form opening 665 (FIG. 6E). In one embodiment, silicon wafer 702 is etched using a DRIE process. Afterwards, the remaining photoresist 720 is stripped.

In step O, portions of oxide layer 716 are removed from the structure to release the various components of device 600 while maintaining the bonds between the corresponding bonding and anchoring pads. In one embodiment, portions of oxide layer 716 are removed using a hydrofluoric acid wet etch.

In step P, the bottom surface of mirror 606 (FIG. 6C) is deposited with a reflective material (e.g., aluminum) to create a mirror surface. In one embodiment, a shadow mask is used to define areas to be deposited with the reflective material.

In step Q, devices 600 made from wafers 702 and 712 are singulated. In one embodiment, wafers 702 and 712 are singulated by dicing through separation trenches 709 and 719.

Referring back to FIG. 6A, the operation of device 600 in one embodiment is explained hereafter. Rotational comb teeth 616 are coupled via bonding pad 624 to receive a reference voltage from a voltage source 676 (e.g., ground). Stationary comb teeth 634 are coupled via bonding pad 636 to receive a steady voltage from a voltage source 678 (e.g., a DC voltage source). Stationary comb teeth 674 (FIGS. 6D and 6E) are coupled via bonding pad 672 to receive an oscillating voltage from a voltage source 680 (e.g., an AC voltage source). Thus, a steady voltage difference between rotational comb teeth 616 and stationary comb teeth 634 changes the natural frequency and the rotation amplitude of device 600, whereas an AC voltage difference between rotational comb teeth 616 and stationary comb teeth 674 (FIGS. 6D and 6E) oscillates the mirror at the desired scanning frequency and at the desired scanning angle.

Figure 6G:
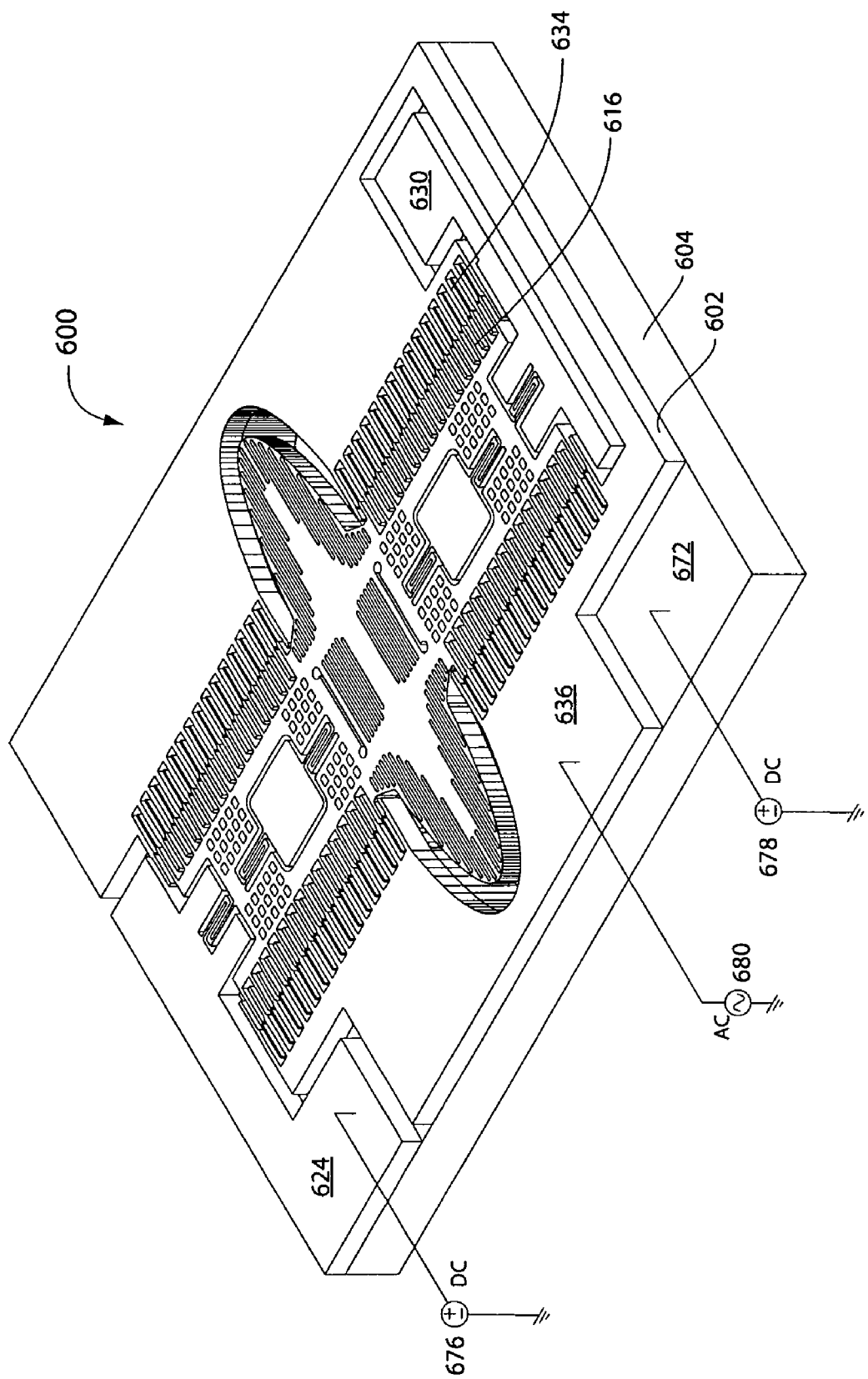
FIGS. 6G, 6H, 6I, and 6J illustrate the MEMS device of FIG. 6A with different power schemes in embodiments of the invention.

Referring to FIG. 6G, the operation of device 600 in another embodiment is explained hereafter. Rotational comb teeth 616 are coupled via bonding pad 624 to receive a steady voltage from a DC voltage source ground 676. Stationary comb teeth 634 are coupled via bonding pad 636 to receive an oscillating voltage from AC voltage source 680. Stationary comb teeth 674 (FIGS. 6D and 6E) are coupled via bonding pad 672 to receive a steady voltage from DC voltage source 678. Between rotational comb teeth 616 and stationary comb teeth 634, a steady voltage difference changes the natural frequency and the rotation amplitude of device 600 while an AC voltage difference oscillates the mirror at the desired scanning frequency and at the desired scanning angle. A steady voltage difference between rotational comb teeth 616 and stationary comb teeth 674 (FIGS. 6D and 6E) can be used to change the amplitude of the rotational angle of device 600. The capacitance between rotational comb teeth 616 and stationary comb teeth 674 can also be sensed through respective bonding pads 636 and 672 to determine the rotational angle of device 600.

Figure 6H:
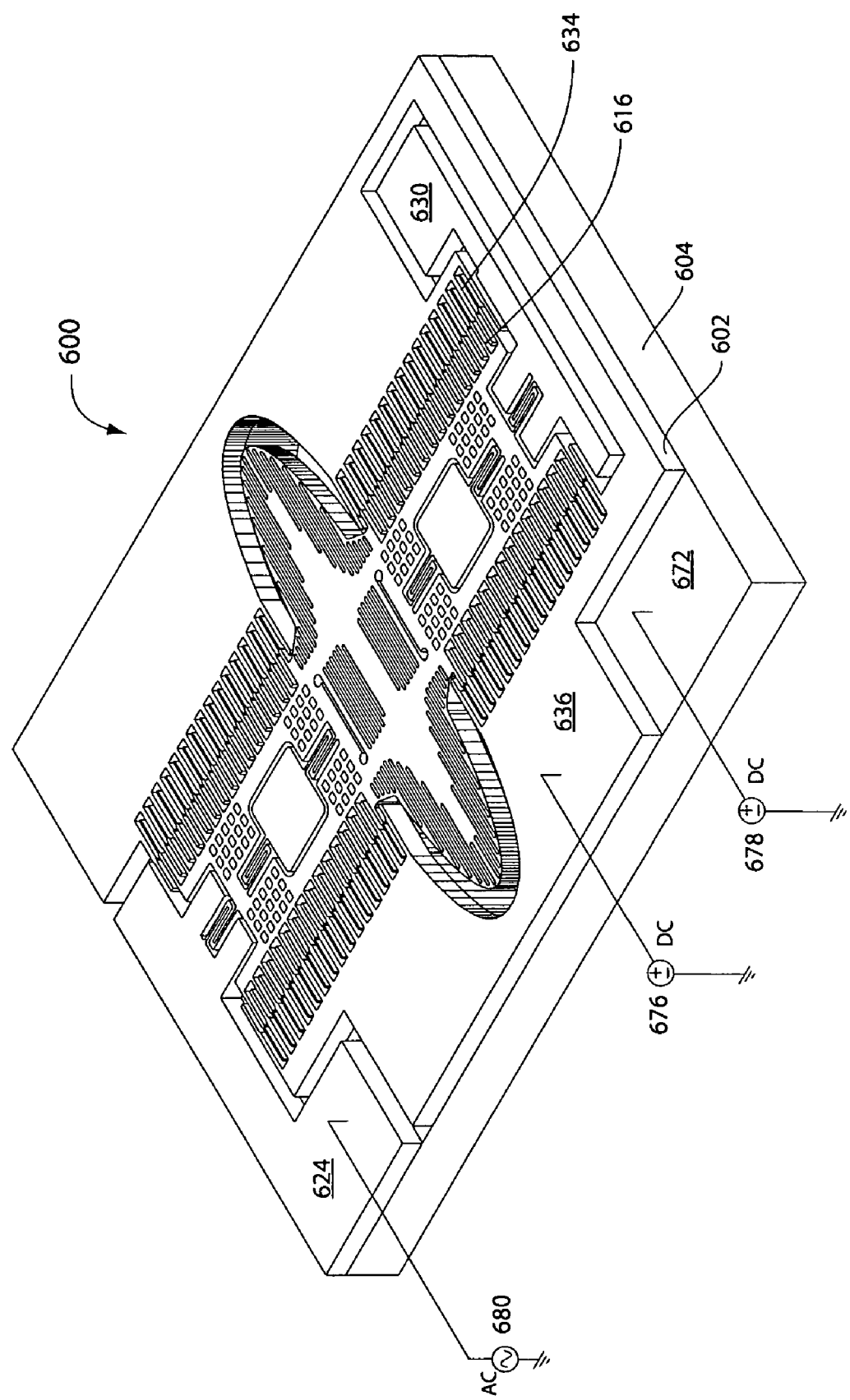

Referring to FIG. 6H, the operation of device 600 in another embodiment is explained hereafter. Rotational comb teeth 616 are coupled via bonding pad 624 to receive an oscillating voltage from AC voltage source 680. Stationary comb teeth 634 are coupled via bonding pad 636 to receive a steady voltage from DC voltage source 676. Stationary comb teeth 674 (FIGS. 6D and 6E) are coupled via bonding pad 672 to receive a steady voltage from DC voltage source 678. Between rotational comb teeth 616 and stationary comb teeth 634, a steady voltage difference changes the natural frequency and the rotation amplitude of device 600 while an AC voltage difference oscillates the mirror at the desired scanning frequency and at the desired scanning angle. A steady voltage difference between rotational comb teeth 616 and stationary comb teeth 674 (FIGS. 6D and 6E) can be used to change the amplitude of the rotational angle of device 600. The capacitance between rotational comb teeth 616 and stationary comb teeth 674 can also be sensed through respective bonding pads 636 and 672 to determine the rotational angle of device 600.

Figure 6I:
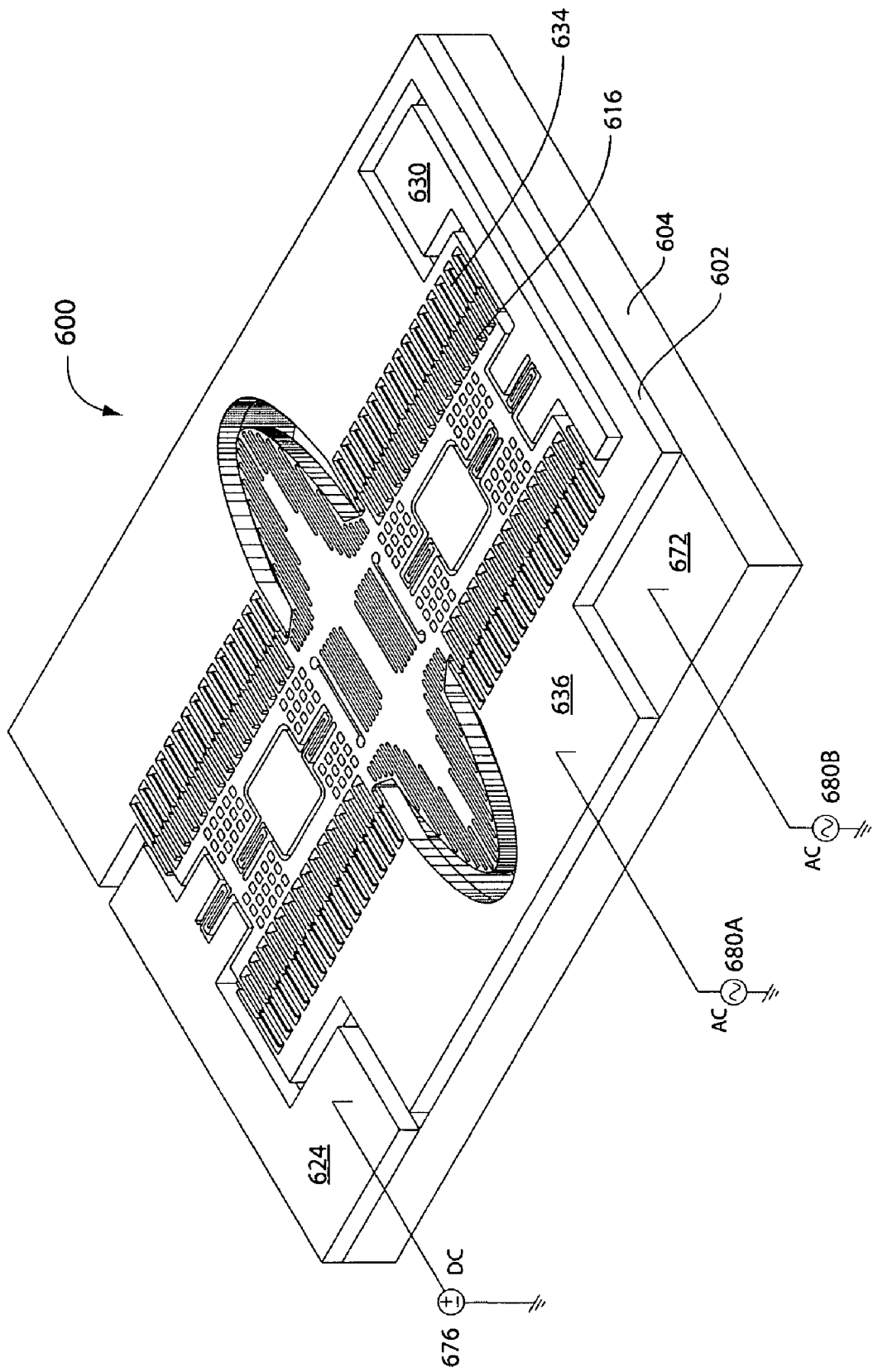
Figure 6J:
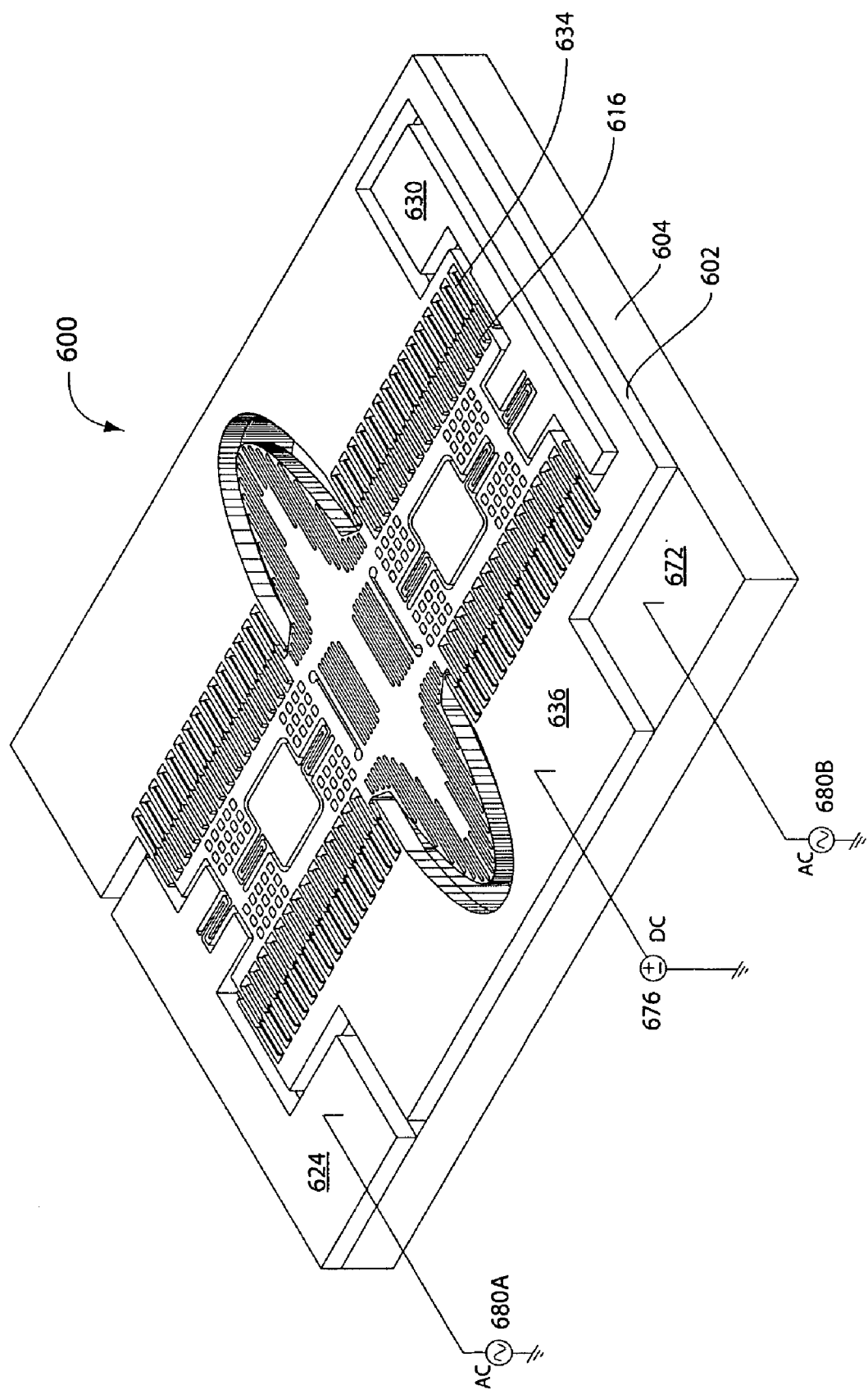

Referring to FIG. 6J, the operation of device 600 in another embodiment is explained hereafter. Rotational comb teeth 616 are coupled via bonding pad 624 to receive an oscillating voltage from AC voltage source 680A. Stationary comb teeth 634 are coupled via bonding pad 636 to receive a steady voltage from DC voltage source 676. Stationary comb teeth 674 (FIGS. 6D and 6E) are coupled via bonding pad 672 to receive an oscillating voltage from AC voltage source 680B. Between rotational comb teeth 616 and stationary comb teeth 634, a DC voltage difference changes the natural frequency and the rotation amplitude of device 600 while an AC voltage difference oscillates the mirror at the desired scanning frequency and at the desired scanning angle. Between rotational comb teeth 616 and stationary comb teeth 674 (FIGS. 6D and 6E), a DC voltage difference can also be used to change the amplitude of the rotational angle of device 600 while an oscillating voltage difference can also be used to oscillate the mirror at the desired scanning frequency and at the desired scanning angle. The capacitance between rotational comb teeth 616 and stationary comb teeth 674 can also be sensed through respective bonding pads 636 and 672 to determine the rotational angle of device 600.

Referring to FIG. 6I, the operation of device 600 in another embodiment is explained hereafter. Rotational comb teeth 616 are coupled via bonding pad 624 to receive a steady voltage from DC voltage source 676. Stationary comb teeth 634 are coupled via bonding pad 636 to receive an oscillating voltage from an AC voltage source 680A. Stationary comb teeth 674 (FIGS. 6D and 6E) are coupled via bonding pad 672 to receive an oscillating voltage from an AC voltage source 680B. The oscillating voltage provided by AC voltage source 680B is out of phase (e.g., 180 degrees out of phase) with the oscillating voltage provided by voltage source 680A. Between rotational comb teeth 616 and stationary comb teeth 634, a steady voltage difference changes the natural frequency and the rotation amplitude of device 600 while an AC voltage difference oscillates the mirror at the desired scanning frequency and at the desired scanning angle. An AC voltage difference between rotational comb teeth 616 and stationary comb teeth 674 (FIGS. 6D and 6E) can also be used to oscillate the mirror at the desired scanning frequency and at the desired scanning angle. The capacitance between rotational comb teeth 616 and stationary comb teeth 674 can also be sensed through respective bonding pads 636 and 672 to determine the rotational angle of device 600.

Figure 8:
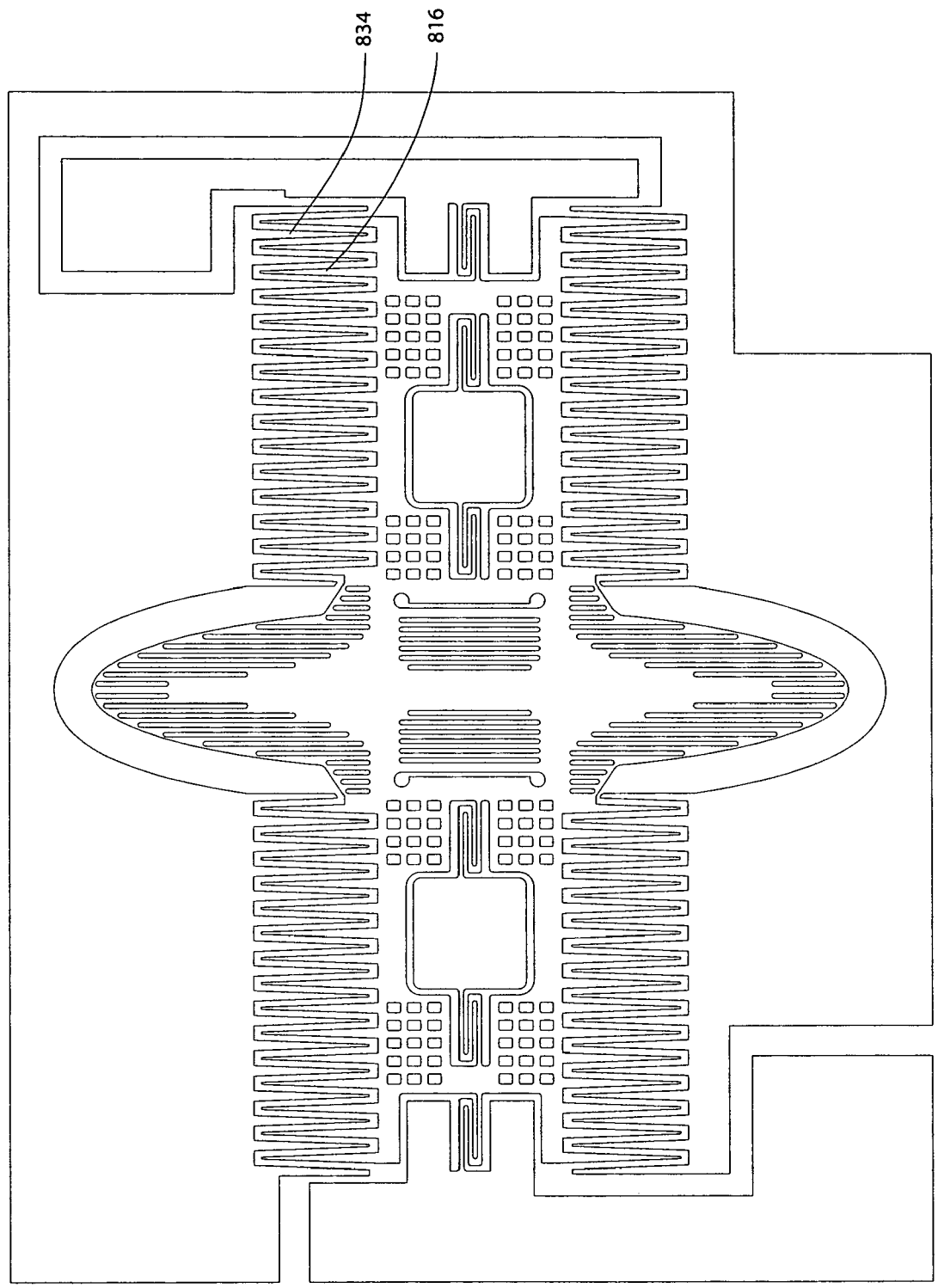
FIG. 8 illustrates comb teeth in one embodiment of the invention.

FIG. 8 illustrates comb teeth having another shape in one embodiment of the invention. Rotational comb teeth 816 each has a triangular body that tapers from the base to the end. By reducing the size and thus the weight of rotational comb teeth 816 at its ends, the inertia of the entire structure is reduced. By reducing the structural inertia, the scanning speed can be increased or/and the driving voltage can be reduced. Stationary comb teeth 834 and the stationary comb teeth in the lower layer can have the same triangular shape.

Various other adaptations and combinations of features of the embodiments disclosed are within the scope of the invention. Numerous embodiments are encompassed by the following claims.

What is claimed is:

1. A method for making a MEMS mirror device, comprising:
   etching a first wafer to form:
      a bottom mirror layer comprising a web protruding from a bottom flange;
      an anchoring pad;
   bonding a second wafer having a bottom oxide layer atop the first wafer;
   etching the second wafer to form:
      a top mirror layer comprising a top flange and trenches on the top flange, the top flange being bonded atop the web of the bottom mirror layer to form a mirror;
      a beam connected to the top mirror layer;
      a first spring connecting the beam to a first bonding pad, the first bonding pad being bonded atop the anchoring pad;
      a plurality of rotational comb teeth connected to the beam;
      a first plurality of stationary comb teeth connected to a second bonding pad, the second bonding pad being bonded atop the anchoring pad.

2. The method of claim 1, wherein said etching the second wafer comprises concurrently etching the trenches and gaps around other components in the second wafer, the trenches having a smaller width than the gaps around the other components in the second wafer.

3. The method of claim 1, wherein said etching the second wafer comprises:

concurrently etching the trenches and gaps around other components in the second wafer;

placing a shadow mask over the top mirror layer; and etching through the gaps around the other components in the second wafer.

4. The method of claim 1, wherein said etching the second wafer comprises etching through a gap around the top mirror layer before etching through gaps around other components in the second wafer.

5. The method of claim 1, wherein said etching a first wafer further forms a first plurality of stationary comb teeth.

6. The method of claim 5, wherein said etching a first wafer comprises etching a first gap around the first plurality of stationary comb teeth deeper than a second gap between adjacent teeth in the first plurality of stationary comb teeth.

7. The method of claim 1, further comprising etching through a gap around the bottom mirror layer to allow the mirror to rotate.

8. The method of claim 7, further comprising wet etching the bottom oxide layer to release bonded components between the first and the second wafers.

9. The method of claim 1, further comprising laser trimming the top mirror layer.

10. The method of claim 1, further comprising forming a reflective layer on the bottom flange.

* * * * *